United States Patent
Gibson et al.

(10) Patent No.: US 12,277,616 B2
(45) Date of Patent: Apr. 15, 2025

(54) SYSTEMS AND METHODS FOR GENERATING A HOME SCORE FOR A USER

(71) Applicant: STATE FARM MUTUAL AUTOMOBILE INSURANCE COMPANY, Bloomington, IL (US)

(72) Inventors: Sharon Gibson, Carlock, IL (US); Nicholas Carmelo Marotta, Scottsdale, AZ (US); Daniel Wilson, Glendale, AZ (US); David Frank, Tempe, AZ (US); Phillip Michael Wilkowski, Phoenix, AZ (US); Jason Goldfarb, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/972,261

(22) Filed: Oct. 24, 2022

(65) Prior Publication Data
US 2023/0342868 A1    Oct. 26, 2023

Related U.S. Application Data

(63) Continuation of application No. 17/816,379, filed on Jul. 29, 2022.
(Continued)

(51) Int. Cl.
*G06Q 50/16* (2012.01)
(52) U.S. Cl.
CPC .................................. *G06Q 50/16* (2013.01)
(58) Field of Classification Search
None
See application file for complete search history.

(56) References Cited

U.S. PATENT DOCUMENTS 5,483,153 A    1/1996  Leeb et al.
5,872,358 A    2/1999  Todokoro et al.
(Continued)

FOREIGN PATENT DOCUMENTS

AU    2015100551 A4    5/2015
CN    110260927 A       9/2019
(Continued)

OTHER PUBLICATIONS

Qolomany, Basheer, et al. "Leveraging machine learning and big data for smart buildings: A comprehensive survey", 2019, IEEE Access 7, pp. 1-39. (Year: 2019).*

(Continued)

*Primary Examiner* — Sarah M Monfeldt
*Assistant Examiner* — Michael J. Monaghan
(74) *Attorney, Agent, or Firm* — MARSHALL, GERSTEIN & BORUN LLP

(57) ABSTRACT

Systems and methods are described for evaluating and analyzing home data to generate a home score. The method may include: (1) retrieving home data for a property; (2) determining, based upon the home data for the property, one or more home score factors, wherein the determining may include: (i) analyzing, using a trained machine learning data evaluation model, the home data for the property to determine home characteristic data for the property, (ii) analyzing, using the trained machine learning data evaluation model, the home data for the property to determine a likelihood of loss associated with the property, and (iii) determining, based upon the home characteristic data for the property and the likelihood of loss associated with the property; and (3) generating, based upon the one or more home score factors, a home score for the property.

20 Claims, 6 Drawing Sheets

Related U.S. Application Data

(60) Provisional application No. 63/333,513, filed on Apr. 21, 2022, provisional application No. 63/332,956, filed on Apr. 20, 2022.

(56) References Cited

U.S. PATENT DOCUMENTS

| | | |
|---|---|---|
| 5,900,629 A | 5/1999 | Todokoro et al. |
| 6,069,356 A | 5/2000 | Todokoro et al. |
| 6,084,238 A | 7/2000 | Todokoro et al. |
| 6,762,686 B1 | 7/2004 | Tabe |
| 6,853,894 B1 | 2/2005 | Kolls |
| 6,982,710 B2 | 1/2006 | Salomie |
| 6,988,026 B2 | 1/2006 | Breed et al. |
| 7,082,359 B2 | 7/2006 | Breed |
| 7,089,099 B2 | 8/2006 | Shostak et al. |
| 7,103,460 B1 | 9/2006 | Breed |
| 7,289,965 B1 | 10/2007 | Bradley et al. |
| RE40,073 E | 2/2008 | Breed |
| 7,421,321 B2 | 9/2008 | Breed et al. |
| 7,835,919 B1 | 11/2010 | Bradley et al. |
| 7,966,203 B1 | 6/2011 | Pietrzak |
| 8,010,377 B1 | 8/2011 | Bradley et al. |
| 8,027,850 B1 | 9/2011 | Pietrzak |
| 8,055,529 B1 | 11/2011 | Jackson et al. |
| 8,289,160 B1 | 10/2012 | Billman |
| 8,433,344 B1 | 4/2013 | Virga |
| 8,490,006 B1 | 7/2013 | Reeser et al. |
| 8,515,783 B1 | 8/2013 | Weeks |
| 8,527,306 B1 | 9/2013 | Reeser et al. |
| 8,533,144 B1 | 9/2013 | Reeser et al. |
| 8,595,034 B2 | 11/2013 | Bauer et al. |
| 8,595,130 B2 | 11/2013 | Johnson et al. |
| 8,640,038 B1 | 1/2014 | Reeser et al. |
| 8,650,048 B1 | 2/2014 | Hopkins, III et al. |
| 8,655,595 B1 | 2/2014 | Green et al. |
| 8,665,084 B2 | 3/2014 | Shapiro et al. |
| 8,674,544 B2 | 3/2014 | Rada et al. |
| 8,674,831 B1 | 3/2014 | Merrill et al. |
| 8,682,682 B1 | 3/2014 | Bradley et al. |
| 8,712,805 B1 | 4/2014 | Ferries et al. |
| 8,760,285 B1 | 6/2014 | Billman et al. |
| 8,799,029 B2 | 8/2014 | Bodas |
| 8,890,680 B2 | 11/2014 | Reeser et al. |
| 8,892,451 B2 | 11/2014 | Everett et al. |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,213,994 B2 | 12/2015 | Green et al. |
| 9,262,909 B1 | 2/2016 | Grant |
| 9,280,793 B2 | 3/2016 | English et al. |
| 9,286,772 B2 | 3/2016 | Shapiro et al. |
| 9,311,676 B2 | 4/2016 | Helitzer et al. |
| 9,344,330 B2 | 5/2016 | Jacob et al. |
| 9,424,737 B2 | 8/2016 | Bailey et al. |
| 9,443,195 B2 | 9/2016 | Micali et al. |
| 9,472,092 B1 | 10/2016 | Grant |
| 9,536,148 B2 | 1/2017 | Gross |
| 9,552,611 B2 | 1/2017 | Cook |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,812,001 B1 | 11/2017 | Grant |
| 9,818,158 B1 | 11/2017 | Devereaux et al. |
| 9,824,398 B2 | 11/2017 | English et al. |
| 9,888,371 B1 | 2/2018 | Jacob |
| 9,892,463 B1 | 2/2018 | Hakimi et al. |
| 9,898,168 B2 | 2/2018 | Shapiro et al. |
| 9,898,912 B1 | 2/2018 | Jordan, II et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,051 B1 | 4/2018 | Allen et al. |
| 9,947,202 B1 | 4/2018 | Moon et al. |
| 9,978,033 B1 | 5/2018 | Payne et al. |
| 9,996,882 B1 | 6/2018 | Manzella et al. |
| 9,997,056 B2 | 6/2018 | Bleisch |
| 10,002,295 B1 | 6/2018 | Cardona et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,062,118 B1 | 8/2018 | Bernstein et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,107,708 B1 | 10/2018 | Schick et al. |
| 10,142,394 B2 | 11/2018 | Chmielewski et al. |
| 10,158,498 B2 | 12/2018 | Brandman et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,210,498 B1 | 2/2019 | Meyyappan et al. |
| 10,217,068 B1 | 2/2019 | Davis et al. |
| 10,223,750 B1 | 3/2019 | Loo et al. |
| 10,223,751 B1 | 3/2019 | Hutchinson et al. |
| 10,229,394 B1 | 3/2019 | Davis et al. |
| 10,244,294 B1 | 3/2019 | Moon et al. |
| 10,249,158 B1 | 4/2019 | Jordan et al. |
| 10,269,074 B1 | 4/2019 | Patel et al. |
| 10,282,787 B1 | 5/2019 | Hakimi-Boushehri et al. |
| 10,282,788 B1 | 5/2019 | Jordan et al. |
| 10,282,961 B1 | 5/2019 | Jordan et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,311,302 B2 | 6/2019 | Kottenstette et al. |
| 10,311,521 B1 | 6/2019 | Capone et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan et al. |
| 10,353,359 B1 | 7/2019 | Jordan et al. |
| 10,356,303 B1 | 7/2019 | Jordan et al. |
| 10,366,288 B1 | 7/2019 | Kottenstette et al. |
| 10,380,692 B1 | 8/2019 | Parker et al. |
| 10,387,966 B1 * | 8/2019 | Shah ..................... G06Q 40/08 |
| 10,388,135 B1 | 8/2019 | Jordan et al. |
| 10,412,169 B1 | 9/2019 | Madey et al. |
| 10,446,000 B2 | 10/2019 | Friar et al. |
| 10,453,146 B1 | 10/2019 | Stricker et al. |
| 10,467,476 B1 | 11/2019 | Cardona et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,497,250 B1 | 12/2019 | Hayward et al. |
| 10,504,189 B1 | 12/2019 | Gaudin et al. |
| 10,506,411 B1 | 12/2019 | Jacob |
| 10,514,669 B1 | 12/2019 | Call et al. |
| 10,515,372 B1 | 12/2019 | Jordan et al. |
| 10,522,009 B1 | 12/2019 | Jordan et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,572,947 B1 | 2/2020 | Berends et al. |
| 10,573,146 B1 | 2/2020 | Jordan et al. |
| 10,573,149 B1 | 2/2020 | Jordan et al. |

(56) References Cited

U.S. PATENT DOCUMENTS

| | | |
|---|---|---|
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,623,509 B2 | 4/2020 | Delinselle et al. |
| 10,634,576 B1 | 4/2020 | Schick et al. |
| 10,643,072 B2 | 5/2020 | Kottenstette et al. |
| 10,664,922 B1 | 5/2020 | Madigan et al. |
| 10,665,070 B1 | 5/2020 | Picardi |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux et al. |
| 10,713,726 B1 * | 7/2020 | Allen ................... G06Q 40/08 |
| 10,726,492 B2 | 7/2020 | Snyder et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan et al. |
| 10,750,252 B2 | 8/2020 | Petri et al. |
| 10,795,329 B1 | 10/2020 | Jordan et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,818,105 B1 | 10/2020 | Konrardy et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,861,115 B1 | 12/2020 | Stricker et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,930,141 B2 | 2/2021 | De Paz Alberola et al. |
| 10,943,447 B1 | 3/2021 | Jordan et al. |
| 10,949,923 B1 * | 3/2021 | Veith ................... G06Q 40/08 |
| 10,970,990 B1 | 4/2021 | Jacob |
| 10,990,069 B1 | 4/2021 | Jacob |
| 11,003,334 B1 * | 5/2021 | Conway ............. G06Q 40/08 |
| 11,004,320 B1 | 5/2021 | Jordan et al. |
| 11,015,997 B1 | 5/2021 | Schick et al. |
| 11,017,480 B2 | 5/2021 | Shah et al. |
| 11,037,255 B1 | 6/2021 | Ganev et al. |
| 11,042,137 B1 | 6/2021 | Call et al. |
| 11,042,942 B1 | 6/2021 | Hakimi-Boushehri et al. |
| 11,043,098 B1 | 6/2021 | Jordan et al. |
| 11,049,078 B1 | 6/2021 | Jordan et al. |
| 11,055,797 B1 | 7/2021 | Carone |
| 11,074,659 B1 | 7/2021 | Hakimi-Boushehri et al. |
| 11,087,347 B1 | 8/2021 | De Guia et al. |
| 11,087,420 B1 * | 8/2021 | Trundle ............... G06Q 10/06 |
| 11,100,594 B1 | 8/2021 | West et al. |
| 11,118,812 B1 | 9/2021 | Riblet et al. |
| 11,120,506 B1 | 9/2021 | Devereaux et al. |
| 11,126,708 B2 | 9/2021 | Reimer |
| 11,151,378 B2 | 10/2021 | Kottenstette et al. |
| 11,151,654 B2 | 10/2021 | Trainor et al. |
| 11,164,257 B1 | 11/2021 | Devereaux et al. |
| 11,210,552 B2 | 12/2021 | Kossyk et al. |
| 11,210,741 B1 | 12/2021 | Allen et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,308,247 B2 | 4/2022 | McDade |
| 11,348,193 B1 | 5/2022 | Konrardy et al. |
| 11,367,265 B2 | 6/2022 | Vianello et al. |
| 11,393,056 B1 | 7/2022 | Spickes et al. |
| 11,417,212 B1 | 8/2022 | Farooqui et al. |
| 11,449,084 B1 | 9/2022 | Taylor et al. |
| 11,501,100 B1 | 11/2022 | Geng et al. |
| 11,656,097 B2 | 5/2023 | Vega et al. |
| 11,715,074 B2 | 8/2023 | Aspro et al. |
| 11,748,817 B2 | 9/2023 | Szott |
| 11,783,423 B1 | 10/2023 | Yager et al. |
| 11,941,712 B2 | 3/2024 | Trundle |
| 2003/0120588 A1 | 6/2003 | Dodd et al. |
| 2005/0055249 A1 | 3/2005 | Helitzer et al. |
| 2005/0065678 A1 | 3/2005 | Smith et al. |
| 2005/0171645 A1 | 8/2005 | Oswald et al. |
| 2005/0276401 A1 | 12/2005 | Madill et al. |
| 2006/0136273 A1 | 6/2006 | Zizzamia et al. |
| 2007/0185391 A1 | 8/2007 | Morgan |
| 2008/0255862 A1 | 10/2008 | Bailey et al. |
| 2009/0206059 A1 | 8/2009 | Kiko |
| 2009/0212959 A1 | 8/2009 | Suber, III |
| 2009/0261943 A1 | 10/2009 | Jana et al. |
| 2009/0265193 A1 | 10/2009 | Collins et al. |
| 2010/0050264 A1 | 2/2010 | Aebig et al. |
| 2010/0125911 A1 | 5/2010 | Bhaskaran |
| 2010/0217702 A1 | 8/2010 | Tu |
| 2010/0293130 A1 | 11/2010 | Stephan et al. |
| 2011/0213628 A1 * | 9/2011 | Peak ................... G06Q 40/08 |
| | | 705/4 |
| 2011/0270773 A1 | 11/2011 | Siekman et al. |
| 2011/0295624 A1 | 12/2011 | Chapin et al. |
| 2012/0016528 A1 | 1/2012 | Raman et al. |
| 2012/0035777 A1 | 2/2012 | Park |
| 2012/0072239 A1 | 3/2012 | Gibbard et al. |
| 2012/0116820 A1 | 5/2012 | English et al. |
| 2012/0158618 A1 | 6/2012 | Roskos |
| 2012/0290104 A1 | 11/2012 | Holt et al. |
| 2012/0290230 A1 | 11/2012 | Berges et al. |
| 2013/0006674 A1 | 1/2013 | Bowne et al. |
| 2013/0041841 A1 | 2/2013 | Lyons |
| 2013/0066479 A1 | 3/2013 | Shetty et al. |
| 2013/0160072 A1 | 6/2013 | Reus et al. |
| 2013/0262473 A1 | 10/2013 | Scanlon et al. |
| 2013/0307694 A1 | 11/2013 | Amar |
| 2013/0338948 A1 | 12/2013 | Zeifman |
| 2014/0032433 A1 | 1/2014 | Eick et al. |
| 2014/0129160 A1 | 5/2014 | Tran |
| 2014/0200929 A1 | 7/2014 | Fitzgerald et al. |
| 2014/0214750 A1 | 7/2014 | Healy et al. |
| 2014/0266669 A1 | 9/2014 | Fadell et al. |
| 2014/0266682 A1 | 9/2014 | Gettings et al. |
| 2014/0270176 A1 | 9/2014 | Gettings et al. |
| 2014/0306833 A1 | 10/2014 | Ricci |
| 2014/0358592 A1 | 12/2014 | Wedig et al. |
| 2015/0019262 A1 | 1/2015 | Du et al. |
| 2015/0025917 A1 | 1/2015 | Stempora |
| 2015/0061859 A1 * | 3/2015 | Matsuoka ............ G08B 25/008 |
| | | 340/501 |
| 2015/0154712 A1 | 6/2015 | Cook |
| 2015/0154847 A1 | 6/2015 | Oliver et al. |
| 2015/0154850 A1 * | 6/2015 | Fadell ................. G06Q 10/083 |
| | | 340/501 |
| 2015/0227864 A1 | 8/2015 | Payne et al. |
| 2015/0248643 A1 | 9/2015 | Nathanson |
| 2015/0268281 A1 | 9/2015 | Haghighat-Kashani |
| 2015/0302529 A1 | 10/2015 | Jagannathan |
| 2015/0339911 A1 | 11/2015 | Coyne et al. |
| 2015/0347910 A1 | 12/2015 | Fadell et al. |
| 2015/0356686 A1 | 12/2015 | Cook et al. |
| 2015/0357153 A1 | 12/2015 | Makino et al. |
| 2015/0357155 A1 | 12/2015 | Dohi et al. |
| 2016/0035150 A1 | 2/2016 | Barfield et al. |
| 2016/0048934 A1 | 2/2016 | Gross |
| 2016/0055593 A1 | 2/2016 | Groeneveld |
| 2016/0055594 A1 | 2/2016 | Emison |
| 2016/0066066 A1 | 3/2016 | Dharmadhikari et al. |
| 2016/0092959 A1 * | 3/2016 | Gross ................. G06Q 30/0625 |
| | | 705/26.62 |
| 2016/0098530 A1 | 4/2016 | Dill et al. |
| 2016/0110818 A1 | 4/2016 | Shemesh et al. |
| 2016/0117646 A1 | 4/2016 | Lerick et al. |
| 2016/0127144 A1 | 5/2016 | Takahashi et al. |
| 2016/0163186 A1 | 6/2016 | Davidson et al. |
| 2016/0212506 A1 | 7/2016 | Norwood et al. |
| 2016/0275633 A1 | 9/2016 | Gitt et al. |

(56) References Cited

U.S. PATENT DOCUMENTS

| | | |
|---|---|---|
| 2016/0283958 A1 | 9/2016 | Devereaux et al. |
| 2016/0284029 A1 | 9/2016 | Rhodes et al. |
| 2016/0321582 A1 | 11/2016 | Broudou et al. |
| 2016/0321587 A1 | 11/2016 | Gitt et al. |
| 2017/0006135 A1 | 1/2017 | Siebel et al. |
| 2017/0032466 A1 | 2/2017 | Feldman et al. |
| 2017/0039286 A1 | 2/2017 | Walke et al. |
| 2017/0061351 A1 | 3/2017 | Lee et al. |
| 2017/0076408 A1 | 3/2017 | D'Souza et al. |
| 2017/0103465 A1 | 4/2017 | Zentler |
| 2017/0154382 A1 | 6/2017 | McLaughlin et al. |
| 2017/0161614 A1 | 6/2017 | Mehta et al. |
| 2017/0221149 A1 | 8/2017 | Hsu-Hoffman et al. |
| 2017/0322705 A1 | 11/2017 | Conway et al. |
| 2018/0006899 A1 | 1/2018 | Ogrinz |
| 2018/0025430 A1 | 1/2018 | Perl et al. |
| 2018/0033087 A1 | 2/2018 | Delinselle et al. |
| 2018/0034657 A1 | 2/2018 | Brown et al. |
| 2018/0047107 A1 | 2/2018 | Perl et al. |
| 2018/0191867 A1 | 7/2018 | Siebel et al. |
| 2018/0211339 A1 | 7/2018 | Mowatt et al. |
| 2018/0218297 A1 | 8/2018 | Payne et al. |
| 2018/0336652 A1 | 11/2018 | Wani et al. |
| 2018/0365957 A1* | 12/2018 | Wright ............... G08B 21/043 |
| 2018/0375680 A1* | 12/2018 | Wright ............... F24D 19/1048 |
| 2019/0011283 A1 | 1/2019 | Soutar et al. |
| 2019/0035028 A1 | 1/2019 | Jones et al. |
| 2019/0057466 A1 | 2/2019 | Udell |
| 2019/0102840 A1 | 4/2019 | Perl et al. |
| 2019/0121337 A1 | 4/2019 | Cohen et al. |
| 2019/0251520 A1* | 8/2019 | Bentley, III ......... G06Q 50/163 |
| 2019/0259112 A1* | 8/2019 | Siegman ............... G06F 16/29 |
| 2019/0304025 A1* | 10/2019 | Szott .................. G01W 1/00 |
| 2019/0304026 A1 | 10/2019 | Lyman et al. |
| 2020/0302549 A1 | 9/2020 | Jordan et al. |
| 2020/0311825 A1 | 10/2020 | Shah et al. |
| 2020/0320639 A1 | 10/2020 | Shah et al. |
| 2020/0327791 A1 | 10/2020 | Moon et al. |
| 2021/0004910 A1* | 1/2021 | Trundle ................ G06Q 40/08 |
| 2021/0011448 A1 | 1/2021 | Coleman et al. |
| 2021/0018335 A1 | 1/2021 | Hood |
| 2021/0019847 A1 | 1/2021 | Sneed |
| 2021/0035432 A1 | 2/2021 | Moon et al. |
| 2021/0042843 A1 | 2/2021 | Bryant et al. |
| 2021/0073929 A1 | 3/2021 | Rose et al. |
| 2021/0090188 A1 | 3/2021 | Lai et al. |
| 2021/0090300 A1 | 3/2021 | Leppänen et al. |
| 2021/0109485 A1* | 4/2021 | Papadopoulos ........ G06N 20/00 |
| 2021/0150651 A1 | 5/2021 | Shoup |
| 2021/0151195 A1* | 5/2021 | Hayward ............. G06Q 50/16 |
| 2021/0158671 A1 | 5/2021 | Jordan et al. |
| 2021/0182986 A1 | 6/2021 | Butler et al. |
| 2021/0199327 A1* | 7/2021 | Venkatesh ............. F24F 11/64 |
| 2021/0279791 A1* | 9/2021 | Jacoby ................ G06Q 50/163 |
| 2021/0279811 A1* | 9/2021 | Waltman .............. G06V 10/764 |
| 2021/0287297 A1 | 9/2021 | Hayward et al. |
| 2021/0295408 A1* | 9/2021 | Hayden ............. G06F 16/24578 |
| 2021/0312789 A1* | 10/2021 | Linn ................... G08B 29/186 |
| 2021/0374297 A1* | 12/2021 | McDade ............. G06Q 30/0283 |
| 2022/0013222 A1 | 1/2022 | Marotta et al. |
| 2022/0028567 A1* | 1/2022 | Aspro .................. G16Y 40/40 |
| 2022/0051344 A1* | 2/2022 | Dhuvur ................ G06Q 40/08 |
| 2022/0058556 A1* | 2/2022 | Warake ............. G05B 19/41845 |
| 2022/0067851 A1* | 3/2022 | Sinha ................ G06Q 50/06 |
| 2022/0101275 A1 | 3/2022 | Aspro et al. |
| 2022/0138683 A1* | 5/2022 | Nimry ................ H04L 12/2823 705/28 |
| 2022/0179376 A1* | 6/2022 | Fadell ................ H04W 4/80 |
| 2022/0270176 A1* | 8/2022 | Chintakindi ........ G06Q 10/0635 |
| 2022/0277225 A1 | 9/2022 | Gilberton et al. |
| 2022/0335366 A1 | 10/2022 | Sanchez |
| 2022/0343443 A1 | 10/2022 | Graham et al. |
| 2022/0391794 A1 | 12/2022 | Singh et al. |
| 2022/0405856 A1 | 12/2022 | Hedges et al. |
| 2023/0023808 A1 | 1/2023 | Wall et al. |
| 2023/0035517 A1 | 2/2023 | Bentley et al. |
| 2023/0145448 A1* | 5/2023 | Huber ................. G05B 23/024 700/275 |
| 2023/0342732 A1 | 10/2023 | Aspro et al. |
| 2024/0046366 A1 | 2/2024 | Yager et al. |
| 2024/0087290 A1 | 3/2024 | Hedges et al. |

FOREIGN PATENT DOCUMENTS

| | | |
|---|---|---|
| CN | 111402086 A | 7/2020 |
| CN | 111626536 A | 9/2020 |
| CN | 113138558 A | 7/2021 |
| EP | 0769799 A2 | 4/1997 |
| JP | 03-131755 A | 6/1991 |
| JP | 09-017191 A | 1/1997 |
| JP | 2003157357 A | 5/2003 |
| JP | 2009-212232 A | 9/2009 |
| JP | 2014-010928 A | 1/2014 |
| JP | 2014-143096 A | 8/2014 |
| KR | 20150129845 A | 11/2015 |
| WO | WO-2014159131 A2 | 10/2014 |
| WO | 2015/024251 A1 | 2/2015 |
| WO | WO-2016081511 A2 | 5/2016 |
| WO | 2018/052595 A1 | 3/2018 |
| WO | WO-2021087185 A1 | 5/2021 |

OTHER PUBLICATIONS

International Application No. PCT/US2024/023770, International Search Report, mailed Aug. 5, 2024.

International Application No. PCT/US2024/023770, Written Opinion, mailed Aug. 15, 2024.

International Search Report and Written Opinion, International Application No. PCT/US24/23768, mailed on Aug. 6, 2024, 11 pages.

Jiang et al., Design and Implementation of Smart-Home Monitoring System with the Internet of Things Technology, Wireless Communications, Networking and Applications, Conference paper, (2015).

Michalis et al., Quality Evaluation of Residential Houses: The Development of a Real-Time Quality Assessment Tool, International Journal of Business Innovation and Research, 2(1): 80-104 (2013).

Moore et al., An intelligent maintenance system for continuous cost-based prioritisation of maintenance activities, Computers in Industry, 57(6): 595-606 (2006).

Spoor, How can data generated by smart home devices help identify consumer needs, 7th IBA Bachelor Thesis Conference, Jul. 1, 2016, Enschede, The Netherlands (2016).

"16 Factors that affect Homeowners Insurance premiums" by Insurance.com (Year: 2013).

"Are Appliances Covered Under Homeowners Insurance Policies?" by Robert Alley (Year: 2014).

"Smart Homes Create New Risk: How Technology Impacts Insurance Coverage" by HUB (Year: 2016).

"Types of Homeowners Insurance Claims," by Pocketsense—pocketsense.com/types-homeowners-insurance-claims-5385090.html (Year: 2017).

Anomaly Detection: A Survey Varun Chandola, Arindam Banerjee, and Vipin Kumar (Year: 2009).

Chen et al., "Non-Intrusive Occupancy Monitoring using Smart Meters" BuildSys'13: Proceedings of the 5th ACM Workshop on Embedded Systems For Energy-Efficient Buildings, Nov. 2013 pp. 1, https://doi.org/10.1145/2528282.2528294 (Year: 2013).

Chen et al., Preventing Occupancy Detection From Smart Meters, IEEE Transactions on Smart Grid vol. 6, No. 5, Sep. 2015 ( Year: 2015).

Curb, https://energycurb.com/, Sep. 24, 2017 (Year: 2017).

Current Clamp, downloaded from en.wikipedia.org/wiki/Current_clamp on Feb. 6, 2020 (Year: 2020).

Delany, John, Eyedro EBWEM1 Business Electricity Monitor Review, 2014, downloaded from www.pcmag.com/eviews/eyedro-ebweml-business-electricity-monitor. Feb. 7, 2020 (Year: 2014).

(56) References Cited

OTHER PUBLICATIONS

Desjardins/Roost, Smart Water Leak and Freeze Detector, Retrieved from the Internet on May 24, 2019, <https://canadianunderwriter.ca/wp-content/uploads/2017/08/desjardins-370x247.jpg>, 1 page.
Does Homeowners Insurance Cover Spoiled Food After A Power Outage, by Allstate—Mar. 2018 (Year: 2018).
EOSVenturepartners.com, "Neos—a home insurance solution leveraging smart home technology," 2019, Retrieved from the Internet on May 24,219: <http://www.eosventurepartners.com/casestudy/neos-case-study/>, 3 pages.
Facts + Statistics: Homeowners and renters insurance by homeowners (Year: 2020).
Francis, Next-Generation Insurance: Tapping into the Intelligence of Smart Homes, Cognizant (Year: 2015).
International Preliminary Report on Patentability received for PCT Patent Application No. PCT/JP2017/008755, mailed on Dec. 13, 2017, 11 pages (4 pages of English Translation and 7 pages of Original Document)_.
International Search Report and Written Opinion received for PCT Patent Application No. PCT/JP2017/008755, mailed on Jun. 6, 2017, 9 pages (2 pages of English Translation and 7 pages of Original Document).
Kelly, Neural NILM: Deep Neural Networks Applied to Energy Disaggregation, BuildSys '15: Proceedings of the 2nd ACM International Conference on Embedded Systems for Energy-Efficient Built Environments; Nov. 2015 pp. 55-64 (Year: 2015).
Maestro, Sense Home Energy Monitor Week #1 Update, Sep. 24, 2016. Screen captures dated Feb. 7, 2020 from www.youtube.com/watch?v=KqjJT6YcBZQ&list=PLbzeotpXZbGjc8E4fyvQZUNHnhM-PC2J2 (Year: 2016).
Neurio Home Electricity Monitor Review, Jul. 10, 2016, screen capture dated Feb. 7, 2020 from www.youtube.com/watch?v=xhEefU FdPWo. Feb. 7, 2020 (Year: 2016).
Patel et al., Internet of Things-IDT: Definition, Characteristics, Architecture, Enabling Technologies, Application & Future Challenges, International Journal of Engineering Science and Computing, pp. 6122-6131 (Year: 2016).
Pearson correlation coefficient, downloaded from https://en.wikipedia.org/wiki/Pearson_correlation_coefficient, Dec. 1, 2020 (Year:2020).
Sense Home Energy Monitor Unboxing and Installation, Sep. 19, 2016, Screen captures dated Feb. 7, 2020 from Www.youtube.com/watch?v=orkcsNw4sDg (Year: 2016).
The SmartShop, Lightwave RF—How to set up the home energy monitor. Dated Oct. 31, 2012. Screen caps at 1:01,2:10 and 3:06. https://www.youtube.com/watch?v=COqTgsZpMKU (Year: 2012).
What is a CLUE Report? by Roy et al. (Year: 2020).

* cited by examiner

SYSTEMS AND METHODS FOR GENERATING A HOME SCORE FOR A USER

CROSS-REFERENCE TO RELATED APPLICATIONS

This application is a continuation application of U.S. patent application Ser. No. 17/816,379, entitled "SYSTEMS AND METHODS FOR GENERATING A HOME SCORE FOR A USER," filed Jul. 29, 2022, which claims priority to and the benefit of the filing date of provisional U.S. Patent Application No. 63/332,956 entitled "SYSTEMS AND METHODS FOR GENERATING A HOME SCORE FOR A USER," filed on Apr. 20, 2022 and provisional U.S. Patent Application No. 63/333,513 entitled "SYSTEMS AND METHODS FOR GENERATING A HOME SCORE FOR A USER," filed on Apr. 21, 2022. The entire contents of each of the preceding applications are hereby expressly incorporated herein by reference.

FIELD OF THE DISCLOSURE

Systems and methods are disclosed for evaluating and generating a home score for a property using home data.

BACKGROUND

When presenting property to potential homeowners and/or home builders, it may be difficult to convey important information regarding the property, the surrounding area, and/or availability of important public services. This may be particularly true for online or virtual methods for presenting property to potential homeowners and/or home builders. Moreover, conventional methods of providing information to potential homeowners and/or home builders may be inefficient, and generally lack security and privacy. Similarly, conventional methods for providing such information to potential homeowners and/or home builders may lack important details that a potential homeowner and/or home builder would use to make an informed decision. Conventional techniques may have other drawbacks as well.

SUMMARY

The present embodiments may relate to, inter alia, a computer-implemented method for efficiently, securely, and privately evaluating and generating a metric for a property that is representative of important features associated with the property.

In one aspect, a computer-implemented method for evaluating and generating a home score for a property may be provided. The method may be implemented via one or more local or remote processors, servers, sensors, transceivers, memory units, and/or other electronic or electrical components. The method may include: (1) retrieving, by one or more processors, home data for a property; (2) determining, by the one or more processors and based upon the home data for the property, one or more home score factors, wherein the determining may include: (i) analyzing, using a trained machine learning data evaluation model, the home data for the property to determine home characteristic data for the property, (ii) analyzing, using the trained machine learning data evaluation model, the home data for the property to determine a likelihood of loss associated with the property, and/or (iii) determining, based upon the home characteristic data for the property and the likelihood of loss associated with the property; and/or (3) generating, by the one or more processors and based upon the one or more home score factors, a home score for the property. The method may include additional, less, or alternative actions, including those discussed elsewhere herein.

For instance, in some embodiments, the computer-implemented method may include receiving, from a user mobile device (or other computing device), a request for the home score; and displaying, responsive to the request, the home score for the property on the user mobile device. In further embodiments, the computer-implemented method may include displaying, responsive to the request, the home characteristic data for the property on the user mobile device.

In some embodiments, the home characteristic data may include at least one of location data, environment data, first responder data, home structure data, adherence to local construction codes, average power consumption, average water consumption, average security score, and average occupancy score. The retrieving of the home data may be from one or more smart home devices located on the property.

The computer-implemented method may also include determining one or more home construction recommendations based upon the one or more home score factors. Determining the one or more home score factors may include weighting the home characteristic data, and the computer-implemented method may further include (a) determining influential home characteristic factors, wherein the influential home characteristic factors are a subset of the home characteristic data with the highest weight; and/or (b) displaying the influential home characteristic factors to the user, such as on the user mobile device.

In another aspect, a computing device for evaluating and generating a home score for a property may be provided. The computing device may include one or more processors; a communication unit; and a non-transitory computer-readable medium coupled to the one or more processors and the communication unit and storing instructions thereon that, when executed by the one or more processors, cause the computing device to: (1) retrieve home data for a property; (2) determine, based upon the home data for the property, one or more home score factors, wherein the determining may include: (i) analyzing, using a trained machine learning data evaluation model, the home data for the property to determine home characteristic data for the property, (ii) analyzing, using the trained machine learning data evaluation model, the home data for the property to determine a likelihood of loss associated with the property, and/or (iii) determining, based upon the home characteristic data for the property and the likelihood of loss associated with the property, the one or more home score factors; and/or (3) generate, based upon the one or more home score factors, a home score for the property. The computing device may include additional, less, or alternate functionality, including that discussed elsewhere herein.

For instance, in some embodiments, the non-transitory computer-readable medium further stores instructions that, when executed by the one or more processors, cause the computing device to (i) receive, from a user (e.g., from the user mobile device), a request for the home score; and/or (ii) display, responsive to the request, the home score for the property, such as on the user mobile device. In further embodiments, the non-transitory computer-readable medium further stores instructions that, when executed by the one or more processors, cause the computing device to display, responsive to the request, the home characteristic data for the property, such as on the user mobile device.

In some embodiments, the home characteristic data may include at least one of: location data, environment data, first responder data, home structure data, adherence to local construction codes, average power consumption, average water consumption, average security score, and average occupancy score. The retrieving the home data may be from one or more smart home devices located on the property.

In certain embodiments, the non-transitory computer-readable medium further stores instructions that, when executed by the one or more processors, cause the computing device to determine one or more home construction recommendations based upon the one or more home score factors. In further embodiments, determining the one or more home score factors may include weighting the home characteristic data. The non-transitory computer-readable medium further may store instructions that, when executed by the one or more processors, cause the computing device to (a) determine influential home characteristic factors, wherein the influential home characteristic factors are a subset of the home characteristic data with the highest weight; and/or (b) display the influential home characteristic factors to the user, such as on the user mobile device.

In another aspect, a tangible, non-transitory computer-readable medium storing instructions for evaluating and generating a home score for a property may be provided. The non-transitory computer-readable medium stores instructions that, when executed by one or more processors of a computing device, cause the computing device to: (1) retrieve home data for a property; (2) determine, based upon the home data for the property, one or more home score factors, wherein the determining may include: (i) analyzing, using a trained machine learning data evaluation model, the home data for the property to determine home characteristic data for the property, (ii) analyzing, using the trained machine learning data evaluation model, the home data for the property to determine a likelihood of loss associated with the property, and/or (iii) determining, based upon the home characteristic data for the property and the likelihood of loss associated with the property, the one or more home score factors; and/or (3) generate, based upon the one or more home score factors, a home score for the property. The computer-readable instructions may include instructions that provide additional, less, or alternate functionality, including that discussed elsewhere herein.

For instance, in some embodiments, the non-transitory computer-readable medium further may include instructions that, when executed by the one or more processors, cause the computing device to (i) receive, from a user mobile device, a request for the home score; and/or (ii) display, responsive to the request, the home score for the property on the user mobile device. In further embodiments, the non-transitory computer-readable medium further may include instructions that, when executed by the one or more processors, cause the computing device to display, responsive to the request, the home characteristic data for the property, such as on the user mobile device.

In some embodiments, the home characteristic data may include at least one of: location data, environment data, first responder data, home structure data, adherence to local construction codes, average power consumption, average water consumption, average security score, and average occupancy score.

In some embodiments, the non-transitory computer-readable medium further may include instructions that, when executed by the one or more processors, cause the computing device to determine one or more home construction recommendations based upon the one or more home score factors. In further embodiments, determining the one or more home score factors may include weighting the home characteristic data, further wherein the non-transitory computer-readable medium further may include instructions that, when executed by the one or more processors, cause the computing device to (a) determine influential home characteristic factors, wherein the influential home characteristic factors are a subset of the home characteristic data with the highest weight; and/or (b) display the influential home characteristic factors to the user, such as on the user mobile device.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
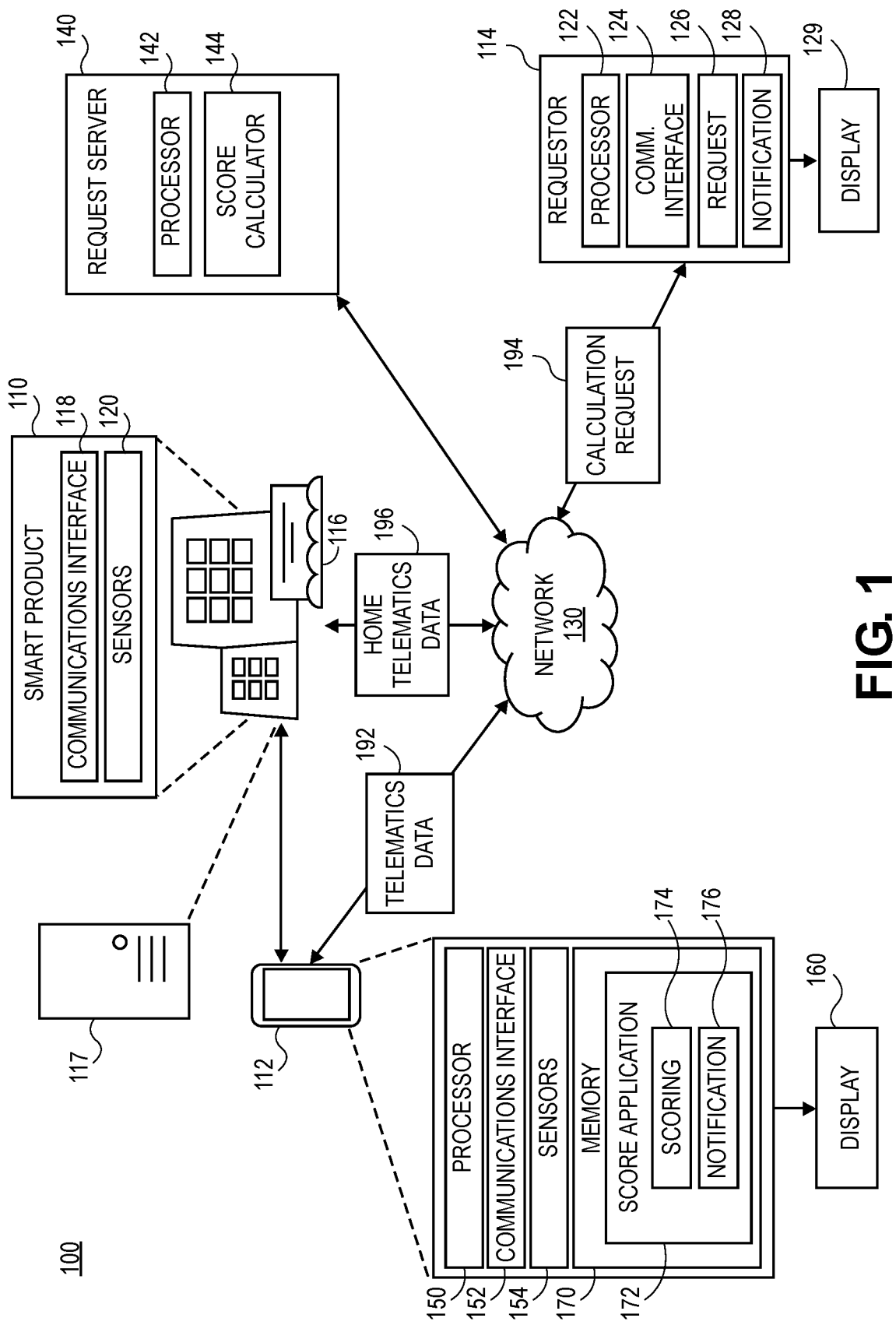
FIG. 1 depicts an exemplary computing system that facilitates retrieving home data from a property, smart device, and/or mobile device, as well as evaluating and generating a home score from home data collected by the system and/or stored on a server.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for evaluating and generating a home score for a property. For example, system may use a machine learning model to evaluate data related to the property and identify data related to characteristics of the property and/or a likelihood of loss associated with the property. The model may then use the characteristic data and/or likelihood of loss to determine relevant factors to the property and subsequently calculate a home score.

In some scenarios, a device may display the calculated home score to a user searching for a home to purchase, rent, etc. In some such embodiments, the device may further display relevant factors and/or characteristics of the property in addition to the calculated home score. In further embodiments, a device may additionally or alternatively display the calculated home score for an empty piece of property to a user deciding whether to build a building on a property and/or what sort of building to build on a property. Similarly, in some such embodiments, the device may further display any relevant factors and/or characteristics of the piece of property.

When searching for, purchasing, and/or building property, potential homeowners and/or property owners can benefit from additional information to facilitate a decision. However, such potential homeowners and/or property owners are unable to access some of the potentially useful information that would influence such a decision. While the data exists, much of the data may be either difficult for an individual to gather, generally held private, and/or the use of the data may not be apparent. By training and/or using a machine learning model trained on home and/or property data to evaluate such data, a system can collect and analyze large quantities of data to determine what data is relevant to a potential decision. Moreover, by training and/or using a machine learning data evaluation model, the system may identify otherwise invisible trends and relations between characteristics and potentially impactful factors, such as the risk inherent in particular building materials and/or designs. As such, the system may generate a home score based upon the characteristics of a property, the likelihood of loss and/or risk, as well as the various identified trends and relationships with home factors.

More specifically, the system may generate the home score based upon factors such as (i) environmental data; (ii) location data; (iii) first responder data; (iv) home structure data; (v) occupancy data; (vi) usage data; and/or (vii) likelihood of loss data. In some embodiments, the system retrieves and analyzes home data using a machine learning model to determine and/or weight the relevant factors. In further embodiments, the system scores the factors in determining an overall home score for the property in question.

In some embodiments, the system may display and/or cause a computing device to display the home score to a user. In further embodiments, the system may similarly display and/or cause a computing device to display home score factors and/or characteristic data to a user in addition to the home score.

Depending on the embodiment, the system may calculate the home score depending on different factors. For example, the system may calculate a home score to show to a user for purchasing and/or renting a house differently than the system may calculate a home score for a user for building a house on empty property. Similarly, the system may display and/or cause a computing device to display the different home scores, home score factors, and/or home characteristic data depending on the application.

In further embodiments, the system may display and/or cause a computing device to display the home score to the user in response to receiving an indication and/or request from the user. For example, the system may display and/or cause a computing device to display a map with icons of properties that, open receiving an indication of a touch event, cause the computing device to display the home score, home score factors, and/or home characteristic data.

The present embodiments relate to computing systems and computer-implemented methods for evaluating and generating a home score for a property. The property may be a house, an office building, an apartment, a condominium, a home extension, a garage, a deck, an empty plot, or any other such property which a user would potentially purchase, build, and/or otherwise develop.

Exemplary System for Calculating a Home Score

FIG. 1 depicts an exemplary computer system 100 for calculating a home score for a property. Depending on the embodiment, the system 100 may calculate a shopping home score, a building home score, a development home score, or any other similar home score for a user. An entity (e.g., requestor 114), such as a user or an insurance company, may wish to calculate and/or view any such home score for a real property (e.g., property 116).

Additionally, the property (e.g., property 116) and, more specifically, a computing device 117 associated with the property 116, a smart device 110 within the property 116, and/or one or more mobile devices may detect, gather, or store home data (e.g., home telematics data) associated with the functioning, operation, and/or evaluation of the property 116. The computing device 117 associated with the property 116 may transmit home telematics data in a communication 196 via the network 130 to a request server 140. In some embodiments, the request server 140 may already store home data (e.g., home telematics data) and/or user data (e.g., user telematics data) in addition to any received home telematics data or user telematics data. Further, the request server 140 may use the home telematics data and/or user telematics data to evaluate and calculate a home score for the property 116. Additionally or alternatively, one or more mobile devices (e.g., mobile device 112) communicatively coupled to the computing device associated with the property 116 may transmit home telematics data and/or user telematics data in communication 192 to the request server 140 via the network 130.

The smart device 110 may include a processor, a set of one or several sensors 120, and/or a communications interface 118. In some embodiments, the smart device 110 may include single devices, such as a smart television, smart refrigerator, smart doorbell, or any other similar smart device. In further embodiments, the smart device 110 may include a network of devices, such as a security system, a lighting system, or any other similar series of devices communicating with one another. The set of sensors 120 may include, for example, a camera or series of cameras, a motion detector, a temperature sensor, an airflow sensor, a smoke detector, a carbon monoxide detector, or any similar sensor.

Although FIG. 1 depicts the set of sensors 120 inside the smart device 110, it is noted that the sensors 120 need not be internal components of the smart device 110. Rather, a property 116 may include any number of sensors in various locations, and the smart device 110 may receive data from these sensors during operation. In further embodiments, the computing device 117 associated with the property 116 may receive data from the sensors during operation. In still further embodiments, the computing device 117 associated with the property 116 may be the smart device 110.

The communications interface 118 may allow the smart device 110 to communicate with the mobile device 112, the sensors 120, and/or a computing device 117 associated with the property 116. The communications interface 118 may support wired or wireless communications, such as USB, Bluetooth, Wi-Fi Direct, Near Field Communication (NFC), etc. The communications interface 118 may allow the smart device 110 to communicate with various content providers, servers, etc., via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc. The processor may operate to format messages transmitted between the smart device 110 and the mobile device 112, sensors 120, and/or computing device 117 associated with the property 116; process data from the sensors 120; transmit communications to the request server 140; etc.

In some embodiments, the smart device 110 may collect the home telematics data using the sensors 120. Depending on the embodiment, the smart device may collect home telematics data regarding the usage and/or occupancy of the property. In some embodiments, the home telematics data may include data such as security camera data, electrical system data, plumbing data, appliance data, energy data, maintenance data, guest data, homeshare data, and any other suitable data representative of property 116 occupancy and/or usage.

For instance, the home telematics data may include data gathered from motion sensors and/or images of the home from which it may be determined how many people occupy the property and the amount of time they each spend within the home. Additionally or alternatively, the home telematics data may include electricity usage data, water usage data, HVAC usage data (e.g., how often the furnace or air conditioner unit is on), and smart appliance data (e.g., how often the stove, oven, dish washer, or clothes washer is operated). The home telematics data may also include home occupant mobile device data or home guest mobile device data, such as GPS or other location data.

The user data (e.g., user telematics data) may include data from the user's mobile device, or other computing devices, such as smart glasses, wearables, smart watches, laptops, etc. The user data or user telematics data may include data associated with the movement of the user, such as GPS or other location data, and/or other sensor data, including camera data or images acquired via the mobile or other computing device. In some embodiments, the user data and/or user telematics data may include historical data related to the user, such as historical home data, historical claim data, historical accident data, etc. In further embodiments, the user data and/or user telematics data may include present and/or future data, such as expected home data when moving, projected claim data, projected accident data, etc. Depending on the embodiment, the historical user data and the present and/or future data may be related.

The user data or user telematics data may also include vehicle telematics data collected or otherwise generated by a vehicle telematics app installed and/or running on the user's mobile device or other computing device. For instance, the vehicle telematics data may include acceleration, braking, cornering, speed, and location data, and/or other data indicative of the user's driving behavior.

The user data or user telematics data may also include home telematics data collected or otherwise generated by a home telematics app installed and/or running on the user's mobile device or other computing device. For instance, a home telematics app may be in communication with a smart home controller and/or smart appliances or other smart devices situated about a home, and may collect data from the interconnected smart devices and/or smart home sensors. Depending on the embodiment, the user telematics data and/or the home telematics data may include information input by the user at a computing device or at another device associated with the user. In further embodiments, the user telematics data and/or the home telematics data may only be collected or otherwise generated after receiving a confirmation from the user, although the user may not directly input the data.

Mobile device 112 may be associated with (e.g., in the possession of, configured to provide secure access to, etc.) a particular user, who may be an owner of a property or a guest staying at the property, such as property 116. In further embodiments, the mobile device 112 may be associated with a potential homeowner, shopper, developer, or other such particular user. Mobile device 112 may be a personal computing device of that user, such as a smartphone, a tablet, smart glasses, smart headset (e.g., augmented reality, virtual reality, or extended reality headset or glasses), smart watch, wearable, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160.

Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including report application 172.

The mobile device 112 may be communicatively coupled to the smart device 110, the sensors 120, and/or a computing device 117 associated with the property 116. For example, the mobile device 112 and the smart device 110, sensors 120, and/or computing device 117 associated with the property 116 may communicate via USB, Bluetooth, Wi-Fi Direct, Near Field Communication (NFC), etc. For example, the smart device 110 may send home telematics data, user telematics data, or other sensor data in the property 116 via communications interface 118 and the mobile device 112 may receive the home telematics data or other sensor data via communications interface 152. In other embodiments, mobile device 112 may obtain the home telematics data from the property 116 from sensors 154 within the mobile device 112.

Further still, mobile device 112 may obtain the home telematics data and/or user telematics data via a user interaction with a display 160 of the mobile device 112. For example, a user may take a photograph indicative of a property and/or input information regarding a characteristics indicative of potential hazards or other such home score factors associated with the property 116 at the display 160. Scoring unit 174 may be configured to prompt a user to take a photograph or input information at the display 160. The mobile device 112 may then generate a communication that may include the home telematics data and/or user telematics data, and may transmit the communication 192 to the request server 140 via communications interface 152.

In some embodiments, the scoring application 172 may include or may be communicatively coupled to a home score application or website. In such embodiments, the request server 140 may obtain the home telematics data and/or user telematics data via stored data in the home score application or via a notification 176 in the scoring application 172 granting the scoring application 172 access to the home score application data.

Depending on the embodiment, a computing device 117 associated with the property 116 may obtain home telematics data for the property 116 indicative of environmental conditions, housing and/or construction conditions, location conditions, first responder conditions, or other similar metrics of home telematics data. The computing device 117 associated with the property 116 may obtain the home telematics data from one or more sensors 120 within the property 116. In other embodiments, the computing device 117 associated with the property 116 may obtain home telematics data through interfacing with a mobile device 112.

Depending on the embodiment, home telematics data may be indicative of both visible and invisible hazards to the property. For example, the home telematics data may include image data of the property 116, as well as internal diagnostic data on functionality of particular devices or components of the property 116. In another example, home telematics data may be used to determine that the property 116 and/or components of the property 116 are likely to require repair and/or replacement, and may lead to a potential risk or claim associated with the property 116. For instance, make/model data, usage data, and age data may be collected from smart appliances and analyzed by a processor to determine that a smart appliance is approaching or likely approaching end-of-life, and needs replacement or maintenance.

In some embodiments, the home telematics data may include interpretations of raw sensor data, such as detecting an intruder event when a sensor detects motion during a particular time period. The computing device 117 associated with the property 116, mobile device 112, and/or smart device 110 may collect and transmit home telematics data to the request server 140 via the network 130 in real-time or at least near real-time at each time interval in which the system 100 collects home telematics data. In other embodiments, a component of the system 100 may collect a set of home telematics data at several time intervals over a time period (e.g., a day), and the smart device 110, computing device 117 associated with the property 116, and/or mobile device 112 may generate and transmit a communication which may include the set of home telematics data collected over the time period.

Also, in some embodiments, the smart device 110, computing device 117 associated with the property 116, and/or mobile device 112 may generate and transmit communications periodically (e.g., every minute, every hour, every day), where each communication may include a different set of home telematics data and/or user telematics data collected over the most recent time period. In other embodiments, the smart device 110, computing device 117 associated with the property 116, and/or mobile device 112 may generate and transmit communications as the smart device 110, mobile device 112, and/or computing device 117 associated with the property 116 receive new home telematics data and/or user telematics data.

In further embodiments, a trusted party may collect and transmit the home telematics data and/or user telematics data, such as an evidence oracle. The evidence oracles may be devices connected to the internet that record and/or receive information about the physical environment around them, such as a smart device 110, a mobile device 112, sensors 120, a request server 140, etc. In further examples, the evidence oracles may be devices connected to sensors such as connected video cameras, motion sensors, environmental conditions sensors (e.g., measuring atmospheric pressure, humidity, etc.), as well as other Internet of Things (IoT) devices.

The data may be packaged into a communication, such as communication 192 or 196. The data from the evidence oracle may include a communication ID, an originator (identified by a cryptographic proof-of-identity, and/or a unique oracle ID), an evidence type, such as video and audio evidence, and a cryptographic hash of the evidence. In another embodiment, the evidence is not stored as a cryptographic hash, but may be directly accessible by an observer or other network participant.

Next, the smart device 110 and/or computing device 117 associated with the property 116 may generate a communication 196 including a representation of the home telematics data wherein the communication 196 is stored at the request server 140 and/or an external database (not shown).

In some embodiments, generating the communication 196 may include (i) obtaining identity data for the smart device 110, computing device 117, and/or the property 116; (ii) obtaining identity data for the mobile device 112 in the property 116; and/or (iii) augmenting the communication 196 with the identity data for the smart device 110, the property 116, the computing device 117, and/or the mobile device 112. The communication 196 may include the home telematics data or a cryptographic hash value corresponding to the home telematics data.

In some embodiments, the mobile device 112 or the smart device 110 may transmit the home telematics data and/or user telematics data to a request server 140. The request server 140 may include a processor 142 and a memory that stores various applications for execution by the processor 142. For example, a score calculator 144 may obtain home telematics data for a property 116 and/or user telematics data for a user to analyze and calculate a risk, home score factor, or home score for a property 116 during a particular time period in response to a calculation request 194, as described in more detail below with regard to FIG. 6.

In further embodiments, a requestor 114 may transmit a communication 194 including a score calculation request to the request server 140 via the network 130. Depending on the embodiment, the requestor may include one or more processors 122, a communications interface 124, a request module 126, a notification module 128, and a display 129. In some embodiments, each of the one or more processors 122, communications interface 124, request module 126, notification module 128, and display 129 may be similar to the components described above with regard to the mobile device 112.

Depending on the embodiment, the requestor 114 may be associated with a particular user, such as a shopper, a home shopping website and/or application, a home rental website and/or application, a construction company, a real estate company, an underwriting company, an insurance company, etc. In some embodiments, the requestor 114 may be associated with the same user as the request server 140. In other embodiments, the requestor 114 is associated with a different user than the request server 140. In some such embodiments, the request module 126 and/or notification module 128 may include or be part of a request application, such as an underwriting application, a shopping application, an insurance application, etc.

In some embodiments, the requestor 114 may transmit a communication 194 including a score request to the requestor 140 via the communications interface 124. In some such embodiments, the requestor 114 may request the score to use as an input to a rating model, an underwriting model, a claims generation model, or any other similarly suitable model. For example, the requestor 114 may request the score to use to determine a potential risk for a property. As another example, the requestor 114 may request multiple scores to determine potential hazards with regard to building types.

Exemplary Home Score Factors

In some embodiments, the home score calculation may include a calculation for home score factors, such as (i) an environment score; (ii) a location score; (iii) a first responder score; (iv) a construction score; (v) a usage score; (vi) an occupancy score; and/or (vii) a risk score. Depending on the embodiment, the environment score may be representative of environmental hazards and/or benefits. For example, the environment score may be representative of weather, temperature, seasonal hazards and/or changes, local fauna, local flora, air quality, pollen, landscape, bodies of water, and any other such suitable environmental hazards and/or benefits.

The location score may be representative of location-based hazards and/or benefits. For example, the location score may be representative of local population density, local classification (e.g., urban, rural, suburban, city, town, village, etc.), proximity to a highway, proximity to public transportation, proximity to various businesses, proximity to neighbors, proximity to schools, crime rates, and any other such suitable location-based hazards and/or benefits.

The first responder score may be representative of accessibility to first responders in emergency events. For example, the first responder score may be representative of proximity to a hospital, proximity to a fire station, proximity to a police station, presence of nearby fire hydrants, ease of ambulance access, crime response rate, crime response time and/or speed, and any other such suitable hazards and/or benefits.

The construction score may be representative of hazards and/or benefits related to the construction of a house or other item on the property. For example, the construction score may be representative of adherence to construction codes, adherence to construction best practices, building materials used, structural stability, architectural design, house age, history of replacements and/or repairs, appliances, smart devices, plumbing, water consumption, power consumption, wiring, security, and any other such suitable hazards and/or benefits. Similarly, the usage score may be representative of hazards and benefits related to the usage of the property, and the occupancy score may be representative of hazards and benefits related to the occupancy of the property.

In some embodiments, the risk score may be representative of a level of risk related to the property. The level of risk calculation may include a determination as to past or potential claim damage and/or severity of claim damage. In some embodiments, the level of risk may refer to a level of risk for a particular time period. Additionally or alternatively, the level of risk may include a determination of a quote or cost associated with the level of risk for the particular time period. In still further embodiments, the level of risk may include a determination of a quote or cost associated with the level of risk for a longer period of time, such as a month, year, etc. In further embodiments, the level of risk may depend on additional factors, such as type of claim, cost of claim, cause of the claim, confirmation of fault, liability amount paid out, property damage paid out, freeform data (need to understand that from a data perspective, so needs other processing), whether coverage is paid, catastrophe, bodily injury, repair costs, estimated values for items damaged, prior damage, claim subrogation status, location of loss, date of loss, time of loss, date the claim was reported, etc.

It will be understood that, in some embodiments, some home telematics data and/or user telematics data may influence multiple home score factors as described above. In some such embodiments, the system 100 may only apply the home telematics data and/or user telematics data to the factor most influenced by the data in question. In other embodiments, the system 100 applies the home telematics data and/or user telematics data to all potential categories. In still other embodiments, the system 100 applies the home telematics data and/or user telematics data to a first factor and then, based upon the application to the first factor, determines not to apply the home telematics data and/or user telematics data to any other factors.

Moreover, the home score provides a benefit through increased security and privacy, as the score reduces risk of reverse engineering private details. Notably, by calculating the home score, the system 100 allows for public disclosure of important and/or useful data without risk of individual characteristics or factors becoming known. For example, a home score of 78 out of 100 for a property would allow a useful metric to a potential buyer or group using the home score for underwriting, but would not provide access to the information underlying the score. For instance, an owner of a property may prefer to keep details regarding insurance claims private, but may still need to assure a potential buyer regarding the home.

In some embodiments, the home score depends on at least one of type of claim, cost of claim, cause of the claim, confirmation of fault, liability amount paid out, property damage paid out, freeform data (need to understand that from a data perspective, so needs other processing), whether coverage is paid, catastrophe, bodily injury, repair costs, estimated values for items damaged, prior damage, claim subrogation status, location of loss, date of loss, time of loss, date the claim was reported, etc. None of the information used to generate the home score is visible, however, allowing for greater privacy and security. As such, the system 100 may anonymize the home score such that anonymized underwriting can be performed using the anonymized home score in that the underlying information is kept unknown to the underwriter.

In some embodiments, a mobile device 112 may stream the home telematics data and/or user telematics data to the request server 140 via the network 130 in real or near-real time. For example, the mobile device and/or a scoring application 172 on the mobile device 112 may update the request server 140 via the network 130 whenever a new event occurs with regard to home telematics data and/or user telematics data. In further embodiments, the mobile device 112 may receive confirmations of updated information and may notify the user that the mobile device 112 has updated the request server 140 via the network 130.

Exemplary Machine Learning

Optionally, the system 100 may determine home characteristic data and/or a level of risk from the home telematics data and/or user telematics data using a machine learning model for data evaluation. The machine learning model may be trained based upon a plurality of sets of home telematics data and/or user telematics data, and corresponding home characteristic data and/or levels of risk. The machine learning model may use the home telematics data and/or user telematics data to generate the home characteristic data and/or level of risk. In some embodiments, the machine learning model may use the home characteristic data and/or level of risk to generate the home score factors and/or the home score. In still further embodiments, the machine learning model may use the home score factors to generate the home score.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

In some embodiments, the methods and systems described herein may use machine learning techniques to identify and estimate the effects of observed or latent variables such as weather, temperature, seasonal hazards and/or changes, local fauna, local flora, air quality, pollen, landscape, bodies of water, local population density, local classification (e.g., urban, rural, suburban, city, town, village, etc.), proximity to a highway, proximity to public transportation, proximity to various businesses, proximity to neighbors, proximity to schools, crime rates, proximity to a hospital, proximity to a fire station, proximity to a police station, presence of nearby fire hydrants, ease of ambulance access, crime response rate, crime response time and/or speed, adherence to construction codes, adherence to construction best practices, building materials used, structural stability, architectural design, house age, history of replacements and/or repairs, appliances, smart devices, plumbing, water consumption, power consumption, wiring, security, type of claim, cost of claim, cause of the claim, confirmation of fault, liability amount paid out, property damage paid out, freeform data (need to understand that from a data perspective, so needs other processing), coverage is paid, catastrophe, bodily injury, repair costs, estimated values for items damaged, prior damage, claim subrogation status, location of loss, date of loss, time of loss, date the claim was reported, etc.

Some embodiments described herein may include automated machine learning to determine risk levels, identify relevant risk factors, evaluate home telematics data and/or user telematics data, identify environmental risk factors, identify locale-based risk factors, identify home structure risk factors, identify first responder-based risk factors, identify occupancy risk factors, identify usage risk factors, calculate an environmental score, calculate a location score, calculate a home structure score, calculate a first responder score, calculate an occupancy score, calculate a usage score, calculate an overall home score, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as customer financial transaction, location, browsing or online activity, mobile device, vehicle, and/or home sensor data) in order to facilitate making predictions for subsequent customer data. Models may be created based upon example inputs of data in order to make valid and reliable predictions for novel inputs.

Additionally or alternatively, the machine learning programs may be trained by inputting sample data sets or certain data into the programs, such as mobile device, server, or home system sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with smart device-mounted, home-mounted, and/or mobile device-mounted sensor data to identify certain home data, such as analyzing home telematics data and/or user telematics data to identify and/or determine environmental data, location data, first responder data, home structure data, occupancy data, usage data, an overall home score, and/or other such potentially relevant data.

After training, machine learning programs (or information generated by such machine learning programs) may be used to evaluate additional data. Such data may be related to publically accessible data, such as building permits and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

Exemplary Requestors

The mobile device 112 and the computing device 117 associated with the property 116 may be associated with the same user. Mobile device 112, and optionally the computing device 117 associated with the property 116, may be communicatively coupled to requestor 114 via a network 130. Network 130 may be a single communication network, or may include multiple communication networks of one or more types (e.g., one or more wired and/or wireless local area networks (LANs), and/or one or more wired and/or wireless wide area networks (WANs) such as the internet). In some embodiments, the requestor 114 may connect to the network 130 via a communications interface 124 much like mobile device 112.

While FIG. 1 shows only one mobile device 112, it is understood that many different mobile devices (of different users), each similar to mobile device 112, may be in remote communication with network 130. Additionally, while FIG. 1 shows only one property 116 and associated computing device 117, it is understood that many different entity locations, each similar to property 116, may include computing devices 117 that are in remote communication with network 130.

Further, while FIG. 1 shows only one requestor, 114, it is understood that many different requestors, each similar to requestor 114, may be in remote communication with network 130. Requestor 114 and/or any other similar requestor may be associated with an insurance company, a regulator organization, a property rental company, and/or a similar organization.

It will be understood that the above disclosure is one example and does not necessarily describe every possible embodiment. As such, it will be further understood that alternate embodiments may include fewer, alternate, and/or additional steps or elements.

Exemplary Architecture for a Computing Device Transmitting Data to be Analyzed

Figure 2:
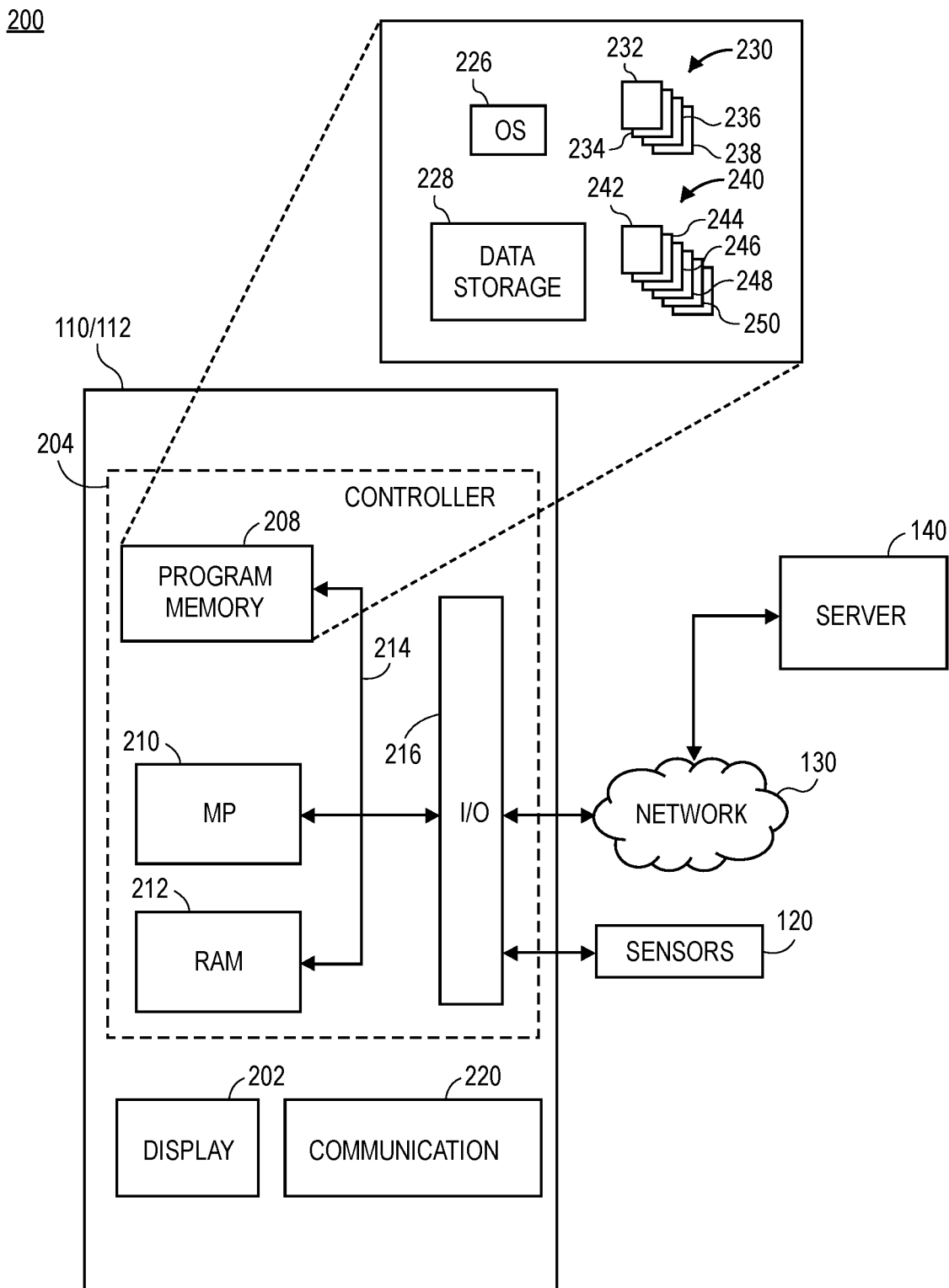
FIG. 2 depicts an exemplary architecture for a mobile device, computing device, or smart device of FIG. 1.

Referring next to FIG. 2, it should be appreciated that while FIG. 2 depicts a smart device 110 and/or mobile device 112 with one microprocessor 210, the controller 204 may include multiple microprocessors 210. Additionally, the memory of the controller 204 may include multiple RAMs 212 and multiple program memories 208. Further, although FIG. 2 depicts the I/O circuit 216 as a single block, the I/O circuit 216 may include a number of different types of I/O circuits. For example, the controller 204 may implement the RAM 212 and the program memory 208 as semiconductor memory, magnetically readable memory, or optically readable memory.

The one or more processors 210 may be adapted and configured to execute any one of the plurality of software applications 230 or any of the plurality of software routines 240 residing in the program memory 204 or elsewhere. One of the plurality of applications 230 may include a home scoring application 232 that may be implemented as a series of machine-readable instructions for performing the various tasks associated with implementing one or more of the operation features according to the home scoring application. Another of the plurality of applications 230 may include a shopping home score application 234 that may be implemented as a series of machine-readable instructions. Another application of the plurality of applications 230 may include a building and/or property development home score application 236 that may be implemented as a series of machine-readable instructions. Another application of the plurality of applications 230 may include a home characteristic data and/or level of risk evaluator 238 that may be implemented as a series of machine-readable instructions. Depending on the embodiments, the plurality of software applications 230 may not perform the actual calculations, but instead facilitate the transfer of home telematics data and/or user telematics data and the results of any calculations between the smart device 110 and/or mobile device 112 and the request server 140 by way of the network 130.

The plurality of software applications 230 may cooperate with any of the plurality of software routines 240 to perform functions relating to analysis, evaluation, and/or scoring of home telematics data and/or user telematics data. In some embodiments, one of the plurality of software routines 240 may be a home characteristic data routine 242 that determines and/or generates home characteristic data from home telematics data and/or user telematics data. Another of the plurality of software routines may be a level of risk and/or risk score routine 244 that determines and/or generates a level of risk and/or a risk score from the home telematics data and/or user telematics data. Another of the plurality of software routines 240 may be a home score factor route 246 to generate a home score from the home characteristic data and/or the risk score.

Still another of the plurality of software routines 240 may be a reporting routine 248 that reports the home telematics data and/or user telematics data to the request server 140 via the network 130. Similarly, one of the plurality of software routines 240 may be a home telematics data and/or user telematics data gathering routine 250 that gathers the home telematics data and/or user telematics data from the smart device 110 and/or mobile device 112. Depending on the embodiment, the plurality of software routines 240 additionally or alternatively causes the request server 140 or sensors 120 to perform functions in addition to or in place of the smart device 110 and/or mobile device 112.

Any of the plurality of software routines 240 may be designed to operate independently of the software applications 230 or in conjunction with the software applications 230 to implement modules associated with the methods discussed herein using the microprocessor 210 of the controller 204. Additionally, or alternatively, the software applications 230 or software routines 240 may interact with various hardware modules that may be installed within or connected to the mobile device 112 or the smart device 110. Such modules may implement some or all of the various exemplary methods discussed herein or other related embodiments.

For instance, such modules may include a module for gathering home telematics data and/or user telematics data from sensors 120, a module for transmitting home telematics data and/or user telematics data to a request server 140, a module for determining a likelihood of risk, a module for calculating home score factors for a property 116, a module for calculating a risk score for a property 116, a module for calculating an overall home score for a property, a module for displaying the home score for the property 116 to a user, and/or other modules.

When gathering and/or transmitting home telematics data and/or user telematics data, the controller 204 of the smart device 110 and/or mobile device 112 may implement a home telematics data and/or user telematics data gathering module by one of the plurality of software applications 230 to communicate with the sensors 120 to receive home telematics data and/or user telematics data as described herein. In some embodiments, including external source communication via the communication unit 220, the controller 204 may further implement a communication module based upon one of the plurality of software applications 230 to receive information from external sources. Some external sources of information may be connected to the controller 204 via the network 130, such as internet-connected third-party databases (not shown). Although the plurality of software applications 230 are shown as separate applications, it is to be understood that the functions of the plurality of software applications 230 may be combined or separated into any number of the software applications 230 or the software routines 240.

In some embodiments, the controller 204 may further implement a reporting module by one of the plurality of software applications 230 to communicate home telematics data and/or user telematics data with the request server 140. The home telematics data and/or user telematics data may be received and stored by the request server 140, and the request server 140 may then use the home telematics data and/or user telematics data to calculate home characteristic data, level risk and/or risk score, home score factors, and/or a home score. In some embodiments, the smart device 110 and/or mobile device 112 then displays a home score to a user on a display 202.

Some example of sensors 120 operatively coupled to the mobile device 112 and/or the smart device 110 include a GPS unit, an optical sensor, a gyroscope, a microphone, an image capturing device, etc., which may provide information relating to the property 116 and relevant home telematics data and/or user telematics data. In some specific instances, the sensors 120 may also be used to monitor power consumption, water consumption, temperature, wind pressure, power generation, etc. It should be appreciated that the aforementioned types of sensors and measurable metrics are merely examples and that other types of sensors and measureable metrics are additionally envisioned.

Furthermore, the communication unit 220 may communicate with databases, other smart devices and/or mobile devices, or other external sources of information to transmit and receive information relating to the home score and home telematics data and/or user telematics data. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Additionally, the communication unit 220 may provide input signals to the controller 204 via the I/O circuit 216. The communication unit 220 may also transmit sensor data, device status information, control signals, and/or other output from the controller 204 to one or more external sensors within the smart devices 110, mobile devices 112, and/or request servers 140.

The mobile device 112 and/or the smart device 110 may include a user-input device (not shown) for receiving instructions or information from a user, such as settings relating to the home score generation features. The user-input device (not shown) may include a "soft" keyboard that is presented on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

It will be understood that the above disclosure is one example and does not necessarily describe every possible embodiment. As such, it will be further understood that alternate embodiments may include fewer, alternate, and/or additional steps or elements.

Exemplary Shopping and Construction Home Score Applications and Interfaces

Figure 3:
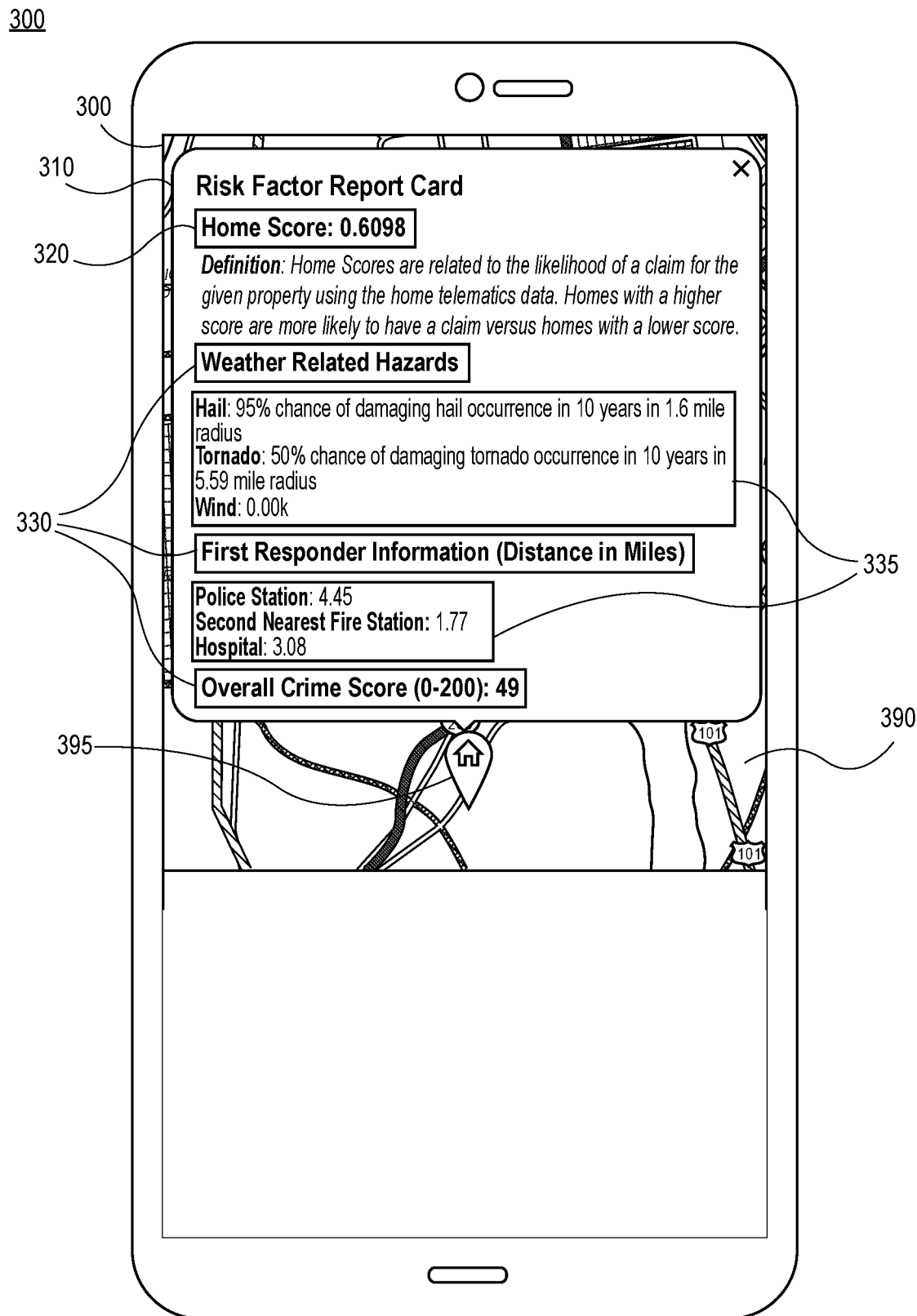
FIG. 3 depicts an exemplary interface for depicting a listing of properties in the form of a map, and displaying a listing of potential risk factors, home score, and factor scores in the network of FIG. 1.

FIG. 3 illustrates an exemplary interface 300 that displays a risk factor report card 310 to a user that may overlay a map 390. The risk factor report card 310 may include a home score 320 for a property 116 as indicated by an icon 395 on the map 390. The risk factor report card 310 may further include a home score 320 (in this case, 0.6098), home score factors 330, and home score factor data 335.

In some embodiments, the home score 320 is based upon the home score factors 330. In such embodiments, the system 100 may calculate the home score factors 330 based upon home telematics data. In particular, the system 100 may retrieve home telematics data related to the property from one or more databases. In some embodiments, the one or more databases may be publically accessible databases, such as government databases, locale databases, weather databases, etc. In further embodiments, the one or more databases may additionally or alternatively be privately accessible databases, such as insurance databases, hazard databases, construction databases, building databases, etc. Depending on the embodiment, the system 100 then calculates the home score factors based upon the gathered home telematics data, as described in more detail with regard to FIG. 6 below.

Further, the interface 300 may display home characteristic data determined from the home telematics data as the home score factor data 335. In some embodiments, the interface 300 displays the home score factor data 335 that the system 100 determines to be most relevant to the home score factors 330 and/or the home score 320. In further embodiments, the interface 300 displays the home score factors 330 that the system 100 determines to be most relevant to the home score 320, and the interface 300 further displays the home score factor data 335 that is most relevant to the chosen home score factors 330. In some embodiments, the home score factor data 335 is based upon the most influential home score factor data (e.g., the home score factor data 335 determined to have and/or assigned the highest weight values for the home score 320 and/or home score factors 330).

In some embodiments, the interface 300 displays the risk factor report card 310 in response to receiving a request from a user. Depending on the embodiment, the request can be a click event on a computing device, a tap event or a swipe event on a mobile device, a gesture event on an extended reality computing device, a search event on a computing device including a search engine, or any other similarly suitable notification method by a user to signify a request for the risk report card. For example, in some embodiments, the user requests the risk factor report card 310 by tapping (i.e., a tap event) on an icon 395 located on a displayed map 390. In response, the interface 300 displays the risk factor report card 310 for the user to view. Although FIG. 3 illustrates one embodiment in which the interface 300 displays a map 390 and an icon 395, it will be understood that the interface may solely consist of the risk factor report card 310. Further, the request may be a search event (e.g., typing an address into a search bar) and the user may access the risk factor report card 310 without interacting with a map 390 or icon 395.

It will be understood that the above disclosure is one example and does not necessarily describe every possible embodiment. As such, it will be further understood that alternate embodiments may include fewer, alternate, and/or additional steps or elements.

Figure 4:
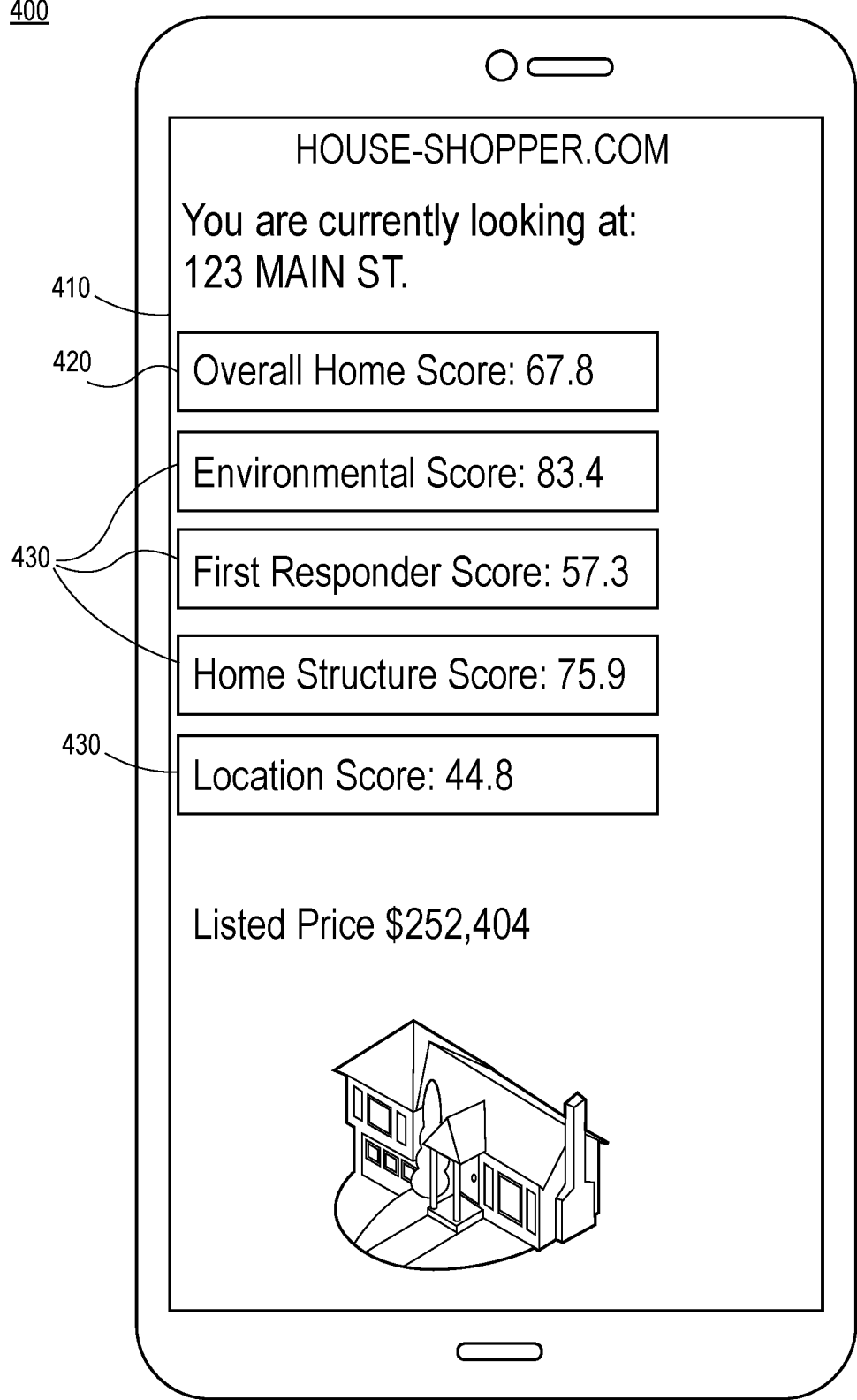
FIG. 4 depicts an exemplary interface for depicting and displaying a shopping home score for a property, as well as related home score factors that influence the overall home score in the network of FIG. 1.

FIG. 4 illustrates an exemplary interface 400 that displays a page 410 of an application or a website providing information for a house to a user. In particular, the page 410 provides an overall home score 420 (in this case, 67.8) and home score factors 430. Although FIG. 4 illustrates four home score factors, it will be understood that a page 410 may provide any suitable number of home factors 430, including none or all applicable home factors 430.

In some embodiments, the overall home score 420 is based upon the home score factors 430. In such embodiments, the system 100 may calculate the home score factors 430 based upon home telematics data. In particular, the system 100 may retrieve home telematics data related to the property from one or more databases. In some embodiments, the one or more databases may be publically accessible databases, such as government databases, locale databases, weather databases, etc. In further embodiments, the one or more databases may additionally or alternatively be privately accessible databases, such as insurance databases, hazard databases, construction databases, building databases, etc.

Depending on the embodiment, the system 100 then calculates the home score factors based upon the gathered home telematics data, as described in more detail with regard to FIG. 6 below. In some embodiments, the interface 410 may include only the home score 420 and/or home score factors 430 (e.g., as a pop-up or link on a webpage). In other embodiments, the interface 410 may include other information relevant to the property 116, such as the address, price, pictures of the house, company, etc.

It will be understood that the above disclosure is one example and does not necessarily describe every possible embodiment. As such, it will be further understood that alternate embodiments may include fewer, alternate, and/or additional steps or elements.

Figure 5:
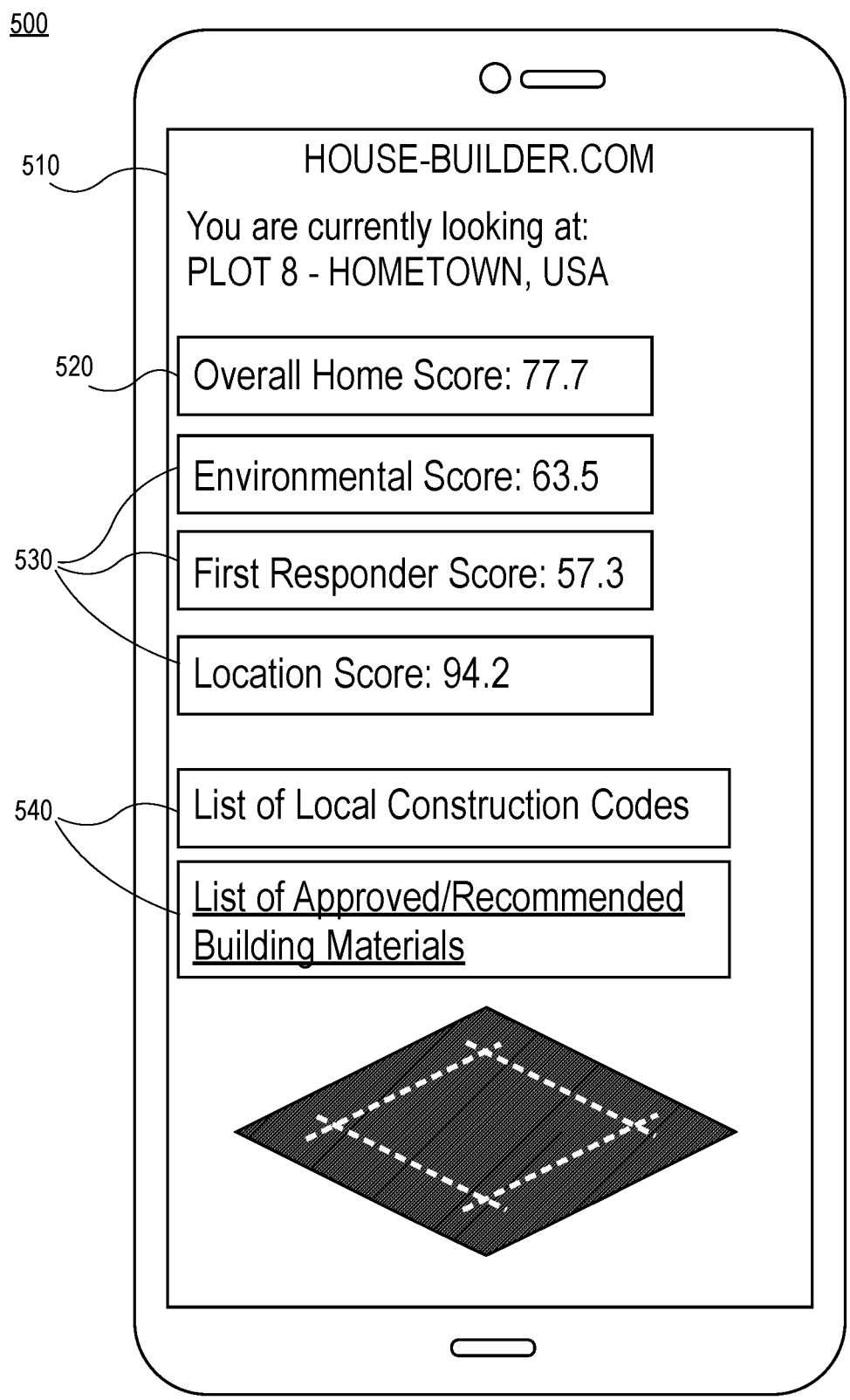
FIG. 5 depicts an exemplary interface for depicting and displaying a building and/or development home score for a property, as well as related home score factors that influence the overall home score in the network of FIG. 1.

FIG. 5 illustrates an exemplary interface 500 that displays a page 510 of an application or a website providing information for a house to a user. In particular, the page 510 provides an overall home score 520 (in this case, 77.7) and home score factors 530. Although FIG. 5 illustrates three home score factors, it will be understood that a page 510 may provide any suitable number of home factors 530, including none or all applicable home factors 530. Moreover, the page 510 may further provide additional home resources 540 related to a property 116 and/or an area surrounding the property 116.

It will be understood that, although the overall home score 520, home score factors 530, and home resources 540 refer to a "home", each may refer to land on a property, regardless of whether developed or undeveloped. As such, it will be understood that the embodiments discussed herein are not limited to physical buildings. Similarly, the embodiments discussed herein are not limited to houses, but may further constitute apartments, condominiums, office buildings, or any other similar building.

Further, it will be understood that, although FIGS. 3-5 depict mobile devices and interfaces, depending on the embodiment, the system 100 may notify a user through email, text, an application, a webpage, a brochure/newsletter, a phone call, or any other similar technique.

It will be understood that the above disclosure is one example and does not necessarily describe every possible embodiment. As such, it will be further understood that alternate embodiments may include fewer, alternate, and/or additional steps or elements.

Figure 6:
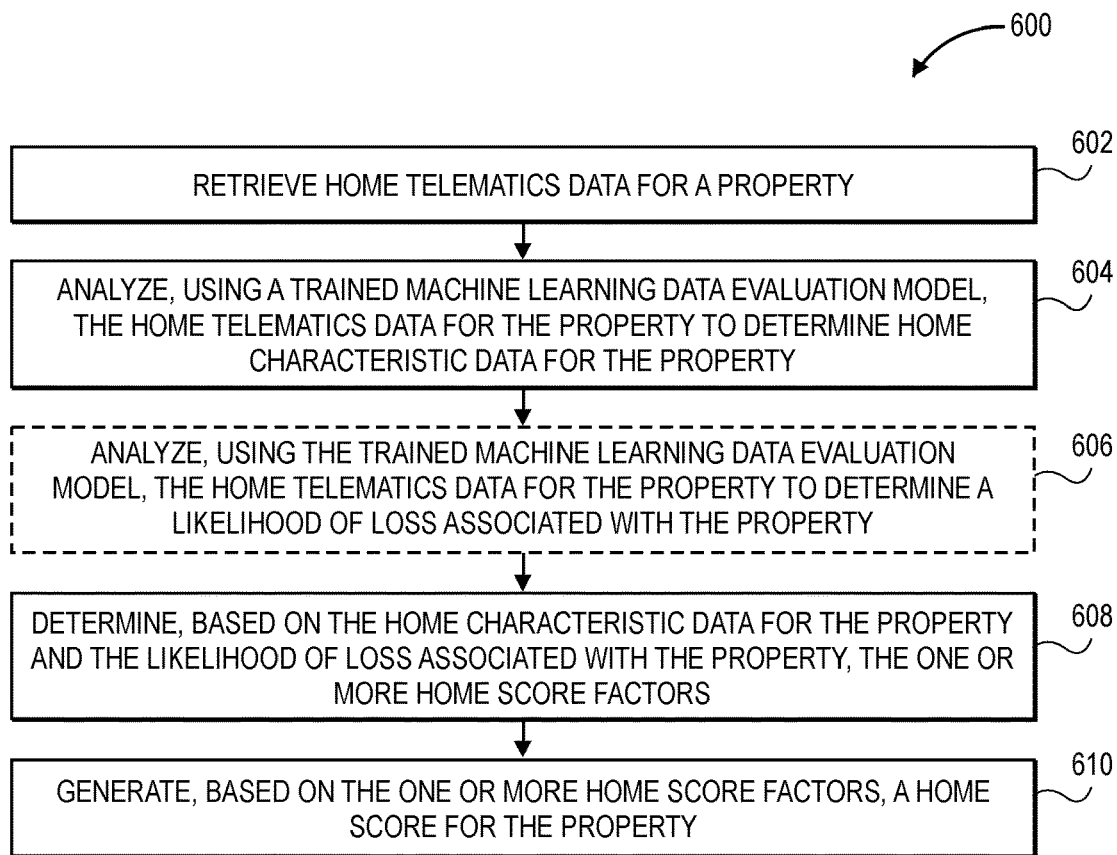
FIG. 6 depicts a flow diagram representing an exemplary computer-implemented method for evaluating and analyzing home data before generating a home score based upon the home data.

Exemplary Methods for Evaluating Home Data to Generate and Display a Shopping or Construction Home Score for a Property FIG. 6 is a flow diagram of an exemplary computer-implemented method 600 for evaluating and generating a home score for a property. The method 600 may be implemented by one or more processors of a computing system such as request server 114 or mobile device 112. Alternatively or additionally, the method 600 may be implemented by one or more processors of a distributed system such as system 100 and/or various components of system 100 as described with regard to FIG. 1 above.

At block 602, the system 100 may retrieve home data (e.g., home telematics data) for a property 116. In some embodiments, the home telematics data may be data collected from one or more publically accessible databases, such as a government database, a weather database, a location database, etc. In further embodiments, the home telematics data may be data collected from privately accessible databases with permission from an owner of the private database, such as an insurance database, a hazard database, an environmental database, etc. In other embodiments, the system 100 may retrieve the home telematics data from one or more smart devices, such as smart device 110. In such embodiments, the home telematics data may be provided by a user who opts in to allow the smart device 110 to provide such information.

The system 100 may then determine, based upon the home telematics data for the property 116, one or more home score factors at blocks 604, 606, and/or 608. At block 604, the system 100 may analyze, using a trained machine learning data evaluation model, the home telematics data for the property 116 to determine home characteristic data for the property 116. Depending on the embodiment, the home characteristic data may be any of location data, environment data, first responder data, home structure data, adherence to local construction codes, average power consumption, average water consumption, security data, occupancy data, detected hazards, predicted hazards, alarm data, or any other similarly suitable data for determining a home score.

In some embodiments, the system 100 may receive the home characteristic data outright in the form of home telematics data and analyzes the received home characteristic data to determine the factors. In other embodiments, the system 100 receives larger quantities and/or ranges of home telematics data and determines what data qualifies as home characteristic data before discarding unimportant data. In some such embodiments, the system 100 may make such a determination by using a trained machine learning model, as described herein.

In some embodiments, at block 606, the system 100 may further analyze the home telematics data using the trained machine learning data evaluation model to determine a likelihood of loss associated with the property 116. Depending on the embodiment, the system 100 may determine the likelihood of loss associated with the property based upon claims data in the home data, such as type of claim, cost of claim, cause of the claim, confirmation of fault, liability amount paid out, property damage paid out, freeform data (need to understand that from a data perspective, so needs other processing), coverage is paid, catastrophe, bodily injury, repair costs, estimated values for items damaged, prior damage, claim subrogation status, location of loss, date of loss, time of loss, date the claim was reported, etc. In other embodiments, the flow of method 600 skips block 606 and goes straight to block 608.

At block 608, the system 100 may determine, based upon the home characteristic data for the property, the one or more home score factors. In embodiments in which the system 100 determines a likelihood of loss associated with the property, the system 100 may further determine the one or more home score factors based upon the likelihood of loss in addition to or in place of the home characteristic data. In such embodiments, the one or more home score factors may include a risk score for the property 116, where the risk score may represent the potential for a claim to occur with regard to the property 116. In such embodiments, the system 100 may use the likelihood of loss and/or claims data pulled from an insurance database to anticipate the likelihood of a claim using the machine learning model. In particular, the system 100 may use either or both of individual claim data related to a particular property 116, or anonymized and/or historical claim data for a broader class of properties.

In such embodiments, the system 100 may train the machine learning model by analyzing large quantities of home telematics data to determine whether various characteristics of a property 116 make the property more or less likely for a claim to occur. For example, the machine learning model of the system 100 may learn that houses closer to first responders are more or less likely to be robbed. Similarly, the machine learning model of the system 100 may make similar determinations with regard to building materials and/or durability, weather, the environment, age of the property, etc.

The system 100 may then use the machine learning model to calculate a risk score for the property 116 that anticipates the likelihood of a claim occurring that relates to and/or arises from the property 116. In some embodiments, the risk score may be a decimal from 0 to 1, a number from 0 to 10, a number from 0 to 100, or any other suitable format for a score.

At block 610, the system 100 may generate, based upon the one or more home score factors, a home score for the property 116. In some embodiments, the system 100 may determine a particular type of home score to generate for the property 116. For example, in some embodiments, the system 100 may determine the home score is a shopping home score for a potential homeowner and/or renter. In other embodiments, the system 100 may determine that the home score is a building home score for a user looking to build a building on empty property. Depending on the embodiment, the system 100 may generate the home score based upon the determination. For example, the system 100 may weigh the home score factors differently or use different home score factors depending on the determination. In further embodiments, the system 100 may make a determination when analyzing the home data and/or when determining the home score factors at blocks 604, 606, and/or 608.

In some embodiments, the system 100 may further determine influential home characteristic factors for the home score. Depending on the embodiment, the system 100 may determine the influential home characteristic factors based upon the weight assigned to each home factor. For example, in some embodiments, the system 100 determines the top 1, 5, 10, or any number of factors with the highest weight. In some such embodiments, the system 100 then displays and/or causes a computing device to display the influential home characteristic factors alongside a home score.

It will be understood that the above disclosure is one example and does not necessarily describe every possible embodiment. As such, it will be further understood that alternate embodiments may include fewer, alternate, and/or additional steps or elements.

Figure 7:
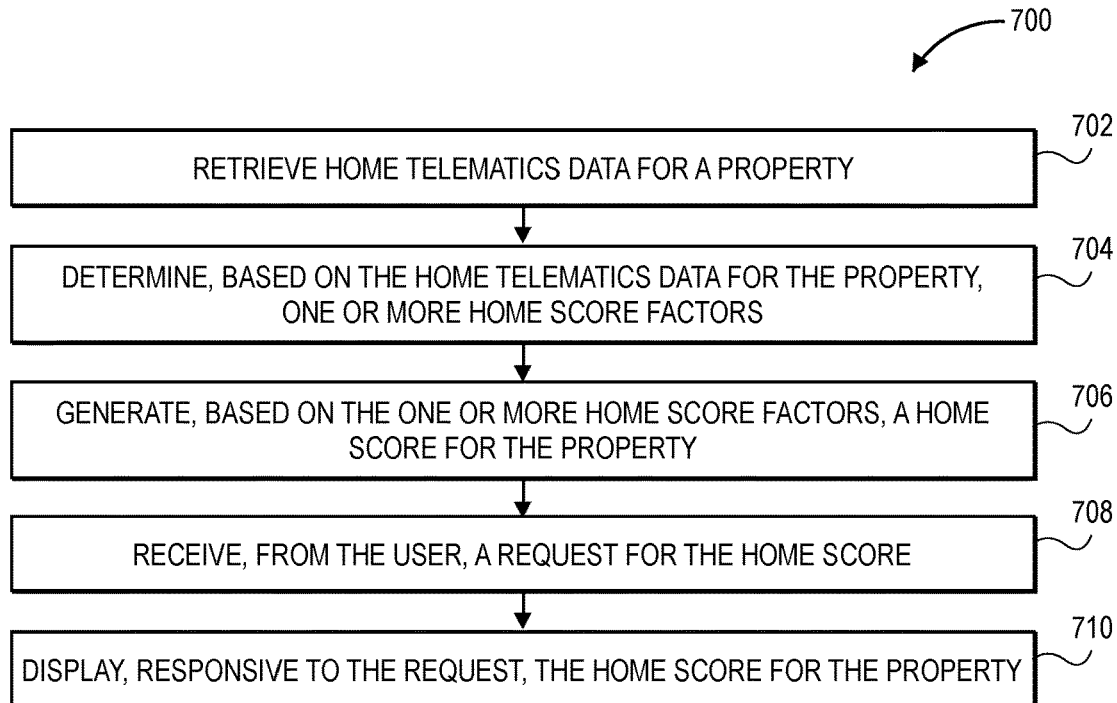
FIG. 7 depicts a flow diagram representing an exemplary computer-implemented method for evaluating home data before generating a home score based upon the home data, and displaying the home score to a user.

Next, FIG. 7 is a flow diagram of an exemplary computer-implemented method 700 for evaluating, generating, and displaying a home score for a property. The method 700 may be implemented by one or more processors of a computing system such as request server 114 or mobile device 112. Alternatively or additionally, the method 700 may be implemented by one or more processors of a distributed system such as system 100 and/or various components of system 100 as described with regard to FIG. 1 above.

At block 702, the system 100 may retrieve home telematics data for a property 116, similar to block 602 above. At block 704, the system 100 may determine one or more home score factors based upon the home telematics data for the property. In some embodiments, the system 100 may determine the home score factors using similar techniques as method 600. For example, depending on the embodiment, the system 100 may determine the home score factors by analyzing the home telematics data for the property 116 to determine home characteristic data and/or a likelihood of loss, similar to blocks 604, 606, and 608 in FIG. 6 above. Similarly, at block 706, the system 100 may generate a home score for the property 116 based upon the home score factors, similar to block 610 in FIG. 6 above.

At block 708, the system 100 may receive a request for the home score from a user. Depending on the embodiment, the request from the user may be a request from a computing device, such as a user clicking on a link for a webpage that displays the score. In further embodiments, the request from the user may be a touch event from the user on a mobile device such as mobile device 112. For example, the user may tap a virtual button or link on the screen of a mobile device to send the request for the score. Similarly, such a touch event may include a tap from a user on a map icon to display the home score, such as icon 395 in FIG. 3 above.

At block 710, the system 100 may display the home score for the property 116 responsive to the request. Depending on the embodiment, the system 100 may display the home score with or without further information related to the calculation of the home score. For example, the system 100 may, in some embodiments, display the home score along with some of the home characteristic data and/or home score factors, such as home score 420 and home score factors 430 in FIG. 4 above. In further embodiments, the system 100 may display the home score along with explanations as to how the home characteristic data influences the home score. For example, the system 100 may display a note that proximity to a toxic waste facility harms the location score. Depending on the embodiment, the system 100 may display 1, 5, 10, or any suitable number of factors that influences the home score value based upon overall impact, difficulty of addressing the issue, age of issue, etc.

It will be understood that the above disclosure is one example and does not necessarily describe every possible embodiment. As such, it will be further understood that alternate embodiments may include fewer, alternate, and/or additional steps or elements.

ADDITIONAL CONSIDERATIONS

With the foregoing, a user may opt-in to a rewards, insurance discount, or other type of program. After the insurance customer provides their affirmative consent, an insurance provider remote server may collect data from the user's mobile device, vehicle, smart home, wearables, smart glasses, or other smart devices—such as with the customer's permission or affirmative consent. The data collected may be related to home telematics data, user telematics data, smart devices, accident data, and/or insured assets before (and/or after) an insurance-related event, including those events discussed elsewhere herein. In return, risk averse insureds, homeowners, home builders, or other such individuals may receive discounts or insurance cost savings related to personal articles, auto, and other types of insurance from the insurance provider.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprises a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

The term "insurance policy," "insurance plan," or variations thereof as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home insurance policies, it should be appreciated that an insurance provider may offer or provide one or more different types of insurance policies. Other types of insurance policies may include, for example, vehicle and/or automobile insurance; homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for evaluating and generating a home score for a property, the computer-implemented method comprising:
    retrieving, by one or more processors, training home telematics sensor data captured by one or more sensors associated with one or more properties;
    retrieving, by the one or more processors, home data for a property including sensor data captured by one or more sensors associated with the property, the sensor data including identification data for the one or more sensors;
    determining, by the one or more processors and based upon the home data for the property, one or more home score factors, wherein the determining includes:
        analyzing, using a trained machine learning data evaluation model, the home data for the property to determine home characteristic data for the property, wherein the trained machine learning data evaluation model is trained with the training home telematics sensor data to determine home characteristic data,
        analyzing, using the trained machine learning data evaluation model, the home data for the property to determine a likelihood of loss associated with the property,
        weighting, using the trained machine learning data evaluation model, the home characteristic data using at least the identification data to generate weighted home characteristic data, and
        determining, based upon the weighted home characteristic data for the property and the likelihood of loss associated with the property, the one or more home score factors;
    isolating, by the one or more processors, influential home characteristic factors, wherein the influential home characteristic factors are a subset of the weighted home characteristic data with the highest weight;
    generating, by the one or more processors and based upon at least the influential home characteristic factors, a home score for the property; and
    training, by the one or more processors, the trained machine learning data evaluation model using at least the home characteristic data, the home score, and the sensor data.

2. The computer-implemented method of claim 1, further comprising:
    receiving, from a user, a request for the home score; and
    displaying, responsive to the request, the home score for the property.

3. The computer-implemented method of claim 2, further comprising:
    displaying, responsive to the request, the home characteristic data for the property.

4. The computer-implemented method of claim 1, wherein the home characteristic data includes at least one of: location data, environment data, first responder data, home structure data, adherence to local construction codes, average power consumption, average water consumption, average security score, and average occupancy score.

5. The computer-implemented method of claim 1, further comprising:
    determining one or more home construction recommendations based upon the one or more home score factors.

6. The computer-implemented method of claim 1, wherein the retrieving the home data is from one or more smart home devices located on the property.

7. The computer-implemented method of claim 1, further comprising:
    displaying the influential home characteristic factors to a user.

8. A computing device for evaluating and generating a home score for a property, the computing device comprising:
    one or more processors;
    one or more sensors associated with a property;
    a communication unit; and
    a non-transitory computer-readable medium coupled to the one or more processors and the communication unit and storing instructions thereon that, when executed by the one or more processors, cause the computing device to:
        retrieve training home telematics sensor data captured by one or more sensors associated with one or more properties;
        retrieve home data for the property including sensor data captured by the one or more sensors, the sensor data including identification data for the one or more sensors;
        determine, based upon the home data for the property, one or more home score factors, wherein the determining includes:
            analyzing, using a trained machine learning data evaluation model, the home data for the property to determine home characteristic data for the property, wherein the trained machine learning data evaluation model is trained with the training home telematics sensor data to determine home characteristic data,
            analyzing, using the trained machine learning data evaluation model, the home data for the property to determine a likelihood of loss associated with the property,
            weighting, using the trained machine learning data evaluation model, the home characteristic data using at least the identification data to generate weighted home characteristic data, and determining, based upon the weighted home characteristic data for the property and the likelihood of loss associated with the property, the one or more home score factors;

isolate influential home characteristic factors, wherein the influential home characteristic factors are a subset of the weighted home characteristic data with the highest weight;

generate, based upon at least the influential home characteristic factors, a home score for the property; and train the trained machine learning data evaluation model using at least the home characteristic data, the home score, and the sensor data.

9. The computing device of claim 8, wherein the non-transitory computer-readable medium further stores instructions that, when executed by the one or more processors, cause the computing device to:

receive, from a user, a request for the home score; and display, responsive to the request, the home score for the property.

10. The computing device of claim 9, wherein the non-transitory computer-readable medium further stores instructions that, when executed by the one or more processors, cause the computing device to:

display, responsive to the request, the home characteristic data for the property.

11. The computing device of claim 8, wherein the home characteristic data includes at least one of: location data, environment data, first responder data, home structure data, adherence to local construction codes, average power consumption, average water consumption, average security score, and average occupancy score.

12. The computing device of claim 8, wherein the non-transitory computer-readable medium further stores instructions that, when executed by the one or more processors, cause the computing device to:

determine one or more home construction recommendations based upon the one or more home score factors.

13. The computing device of claim 8, wherein the retrieving the home data is from one or more smart home devices located on the property.

14. The computing device of claim 8, wherein the non-transitory computer-readable medium further stores instructions that, when executed by the one or more processors, cause the computing device to:

display the influential home characteristic factors to a user.

15. A tangible, non-transitory computer-readable medium storing instructions for evaluating and generating a home score for a property that, when executed by one or more processors of a computing device, cause the computing device to:

retrieve training home telematics sensor data captured by one or more sensors associated with one or more properties;

retrieve home data for a property including sensor data captured by one or more sensors associated with the property, the sensor data including identification data for the one or more sensors;

determine, based upon the home data for the property, one or more home score factors, wherein the determining includes:

analyzing, using a trained machine learning data evaluation model, the home data for the property to determine home characteristic data for the property, wherein the trained machine learning data evaluation model is trained with the training home telematics sensor data to determine home characteristic data, analyzing, using the trained machine learning data evaluation model, the home data for the property to determine a likelihood of loss associated with the property, weighting, using the trained machine learning data evaluation model, the home characteristic data using at least the identification data to generate weighted home characteristic data, and determining, based upon the weighted home characteristic data for the property and the likelihood of loss associated with the property, the one or more home score factors;

isolate influential home characteristic factors, wherein the influential home characteristic factors are a subset of the weighted home characteristic data with the highest weight;

generate, based upon at least the influential home characteristic factors, a home score for the property; and train the trained machine learning data evaluation model using at least the home characteristic data, the home score, and the sensor data.

16. The tangible, non-transitory computer-readable medium of claim 15, wherein the non-transitory computer-readable medium further includes instructions that, when executed by the one or more processors, cause the computing device to:

receive, from a user, a request for the home score; and display, responsive to the request, the home score for the property.

17. The tangible, non-transitory computer-readable medium of claim 16, wherein the non-transitory computer-readable medium further includes instructions that, when executed by the one or more processors, cause the computing device to:

display, responsive to the request, the home characteristic data for the property.

18. The tangible, non-transitory computer-readable medium of claim 15, wherein the home characteristic data includes at least one of: location data, environment data, first responder data, home structure data, adherence to local construction codes, average power consumption, average water consumption, average security score, and average occupancy score.

19. The tangible, non-transitory computer-readable medium of claim 15, wherein the non-transitory computer-readable medium further includes instructions that, when executed by the one or more processors, cause the computing device to:

determine one or more home construction recommendations based upon the one or more home score factors.

20. The tangible, non-transitory computer-readable medium of claim 15, wherein the non-transitory computer-readable medium further includes instructions that, when executed by the one or more processors, cause the computing device to:

display the influential home characteristic factors to a user.

* * * * *